(12) United States Patent
Jang

(10) Patent No.: US 11,888,119 B2
(45) Date of Patent: Jan. 30, 2024

(54) METHOD OF PRODUCING FLAME-RESISTANT QUASI-SOLID ELECTROLYTES AND LITHIUM BATTERIES CONTAINING SAME

(71) Applicant: Global Graphene Group, Inc., Dayton, OH (US)

(72) Inventor: Bor Z. Jang, Centerville, OH (US)

(73) Assignee: Global Graphene Group, Inc., Dayton, OH (US)

( * ) Notice: Subject to any disclaimer, the term of this patent is extended or adjusted under 35 U.S.C. 154(b) by 97 days.

(21) Appl. No.: 17/224,405

(22) Filed: Apr. 7, 2021

(65) Prior Publication Data

US 2022/0336859 A1 Oct. 20, 2022

(51) Int. Cl.

| | | |
|---|---|---|
| *H01M 10/0569* | (2010.01) | |
| *H01M 10/0525* | (2010.01) | |
| *H01M 4/505* | (2010.01) | |
| *H01M 4/525* | (2010.01) | |
| *H01M 10/058* | (2010.01) | |
| *H01M 4/02* | (2006.01) | |

(52) U.S. Cl.
CPC ....... *H01M 10/0569* (2013.01); *H01M 4/505* (2013.01); *H01M 4/525* (2013.01); *H01M 10/058* (2013.01); *H01M 10/0525* (2013.01); *H01M 2004/028* (2013.01); *H01M 2220/20* (2013.01); *H01M 2300/0034* (2013.01); *H01M 2300/0037* (2013.01)

(58) Field of Classification Search
CPC ......... H01M 10/0525; H01M 10/0569; H01M 10/058; H01M 2004/028; H01M 2220/20; H01M 2300/0034; H01M 2300/0037; H01M 4/505; H01M 4/525
See application file for complete search history.

(56) References Cited

U.S. PATENT DOCUMENTS

| | | |
|---|---|---|
| 2,798,878 A | 7/1957 | Hummers |
| 5,532,077 A | 7/1996 | Chu |
| 9,059,481 B2 | 6/2015 | He et al. |
| (Continued) | | |

FOREIGN PATENT DOCUMENTS

| | | | | |
|---|---|---|---|---|
| CN | 106654362 A | * | 5/2017 | ........ H01M 10/0525 |

OTHER PUBLICATIONS

Machine Translation CN106654362A (Year: 2017).*

*Primary Examiner* — Victoria H Lynch

(57) ABSTRACT

A method of producing a rechargeable lithium battery cell, the method comprising (a) preparing a liquid electrolyte solution comprising an ion-conducting polymer dispersed in a first liquid solvent and an optional lithium salt dissolved in the first liquid solvent; (b) impregnating the electrolyte solution into the cathode, the anode, a porous structure of the separator, or the battery cell; (c) removing the first liquid solvent; and (d) impregnating a second liquid solvent, comprising an optional lithium salt dissolved therein, into the cathode, the anode, the separator porous structure, or the battery cell; wherein the ion-conducting polymer comprises a polymer having an ion conductivity from $10^{-8}$ S/cm to $10^{-2}$ S/cm when measured at room temperature without the presence of a liquid solvent and the polymer does not occupy more than 25% by weight of the cathode, not counting a current collector weight.

40 Claims, 4 Drawing Sheets

Charged state

(56) References Cited

U.S. PATENT DOCUMENTS

| | | | |
|---|---|---|---|
| 9,368,831 B2 | 6/2016 | He et al. | |
| 9,601,803 B2 | 3/2017 | He et al. | |
| 9,601,805 B2 | 3/2017 | He et al. | |
| 2007/0026318 A1* | 2/2007 | Kishi | H01M 4/485 |
| | | | 429/223 |
| 2016/0197375 A1* | 7/2016 | Carlson | H01M 10/0525 |
| | | | 429/303 |
| 2017/0207486 A1* | 7/2017 | Wu | H01M 10/0567 |
| 2018/0351196 A1* | 12/2018 | Zhamu | H01M 4/133 |
| 2020/0136187 A1* | 4/2020 | Juzkow | H01M 4/505 |
| 2021/0043969 A1* | 2/2021 | Harrup | H01M 10/0563 |
| 2021/0296637 A1* | 9/2021 | Xie | H01M 4/386 |

\* cited by examiner

Discharged state (or as manufactured)

Charged state

METHOD OF PRODUCING FLAME-RESISTANT QUASI-SOLID ELECTROLYTES AND LITHIUM BATTERIES CONTAINING SAME

FIELD

The present disclosure provides a fire/flame-resistant electrolyte and lithium batteries (lithium-ion and lithium metal batteries) containing such an electrolyte. The electrolyte is cured or solidified in situ inside an electrode, a separator, and/or inside a battery cell.

BACKGROUND

Rechargeable lithium-ion (Li-ion) and lithium metal batteries (e.g., lithium-sulfur, lithium selenium, and Li metal-air batteries) are considered promising power sources for electric vehicle (EV), hybrid electric vehicle (HEV), and portable electronic devices, such as lap-top computers and mobile phones. Lithium as a metal element has the highest lithium storage capacity (3,861 mAh/g) compared to any other metal or metal-intercalated compound as an anode active material (except $Li_{4.4}Si$, which has a specific capacity of 4,200 mAh/g). Hence, in general, Li metal batteries (having a lithium metal anode) have a significantly higher energy density than lithium-ion batteries (having a graphite anode).

However, the electrolytes used for lithium-ion batteries and all lithium metal secondary batteries pose some safety concerns. Most of the organic liquid electrolytes can cause thermal runaway or explosion problems.

Ionic liquids (ILs) are a new class of purely ionic, salt-like materials that are liquid at unusually low temperatures. The official definition of ILs uses the boiling point of water as a point of reference: "Ionic liquids are ionic compounds which are liquid below 100° C.". A particularly useful and scientifically interesting class of ILs is the room temperature ionic liquid (RTIL), which refers to the salts that are liquid at room temperature or below. RTILs are also referred to as organic liquid salts or organic molten salts. An accepted definition of an RTIL is any salt that has a melting temperature lower than ambient temperature.

Although ILs were suggested as a potential electrolyte for rechargeable lithium batteries due to their non-flammability, conventional ionic liquid compositions have not exhibited satisfactory performance when used as an electrolyte likely due to several inherent drawbacks: (a) ILs have relatively high viscosity at room or lower temperatures; thus being considered as not amenable to lithium ion transport; (b) For Li—S cell uses, ILs are capable of dissolving lithium polysulfides at the cathode and allowing the dissolved species to migrate to the anode (i.e., the shuttle effect remains severe); and (c) For lithium metal secondary cells, most of the ILs strongly react with lithium metal at the anode, continuing to consume Li and deplete the electrolyte itself during repeated charges and discharges. These factors lead to relatively poor specific capacity (particularly under high current or high charge/discharge rate conditions, hence lower power density), low specific energy density, rapid capacity decay and poor cycle life. Furthermore, ILs remain extremely expensive. Consequently, as of today, no commercially available lithium battery makes use of an ionic liquid as the primary electrolyte component.

Solid state electrolytes are commonly believed to be safe in terms of fire and explosion proof. Solid state electrolytes can be divided into organic, inorganic, organic-inorganic composite electrolytes. However, the conductivity of organic polymer solid state electrolytes, such as poly(ethylene oxide) (PEO), polypropylene oxide (PPO), poly(ethylene glycol) (PEG), and poly(acrylonitrile) (PAN), is typically low ($<10^{-5}$ S/cm).

Although the inorganic solid-state electrolyte (e.g., garnet-type and metal sulfide-type) can exhibit a high conductivity (about $10^{-3}$ S/cm), the interfacial impedance or resistance between the inorganic solid-state electrolyte and the electrode (cathode or anode) is high. Further, the traditional inorganic ceramic electrolyte is very brittle and has poor film-forming ability and poor mechanical properties. These materials cannot be cost-effectively manufactured. Although an organic-inorganic composite electrolyte can lead to a reduced interfacial resistance, the lithium ion conductivity and working voltages may be decreased due to the addition of the organic polymer.

The applicant's research group has previously developed the quasi-solid state electrolytes (QSSE), which may be considered as a fourth type of solid state electrolyte. In certain variants of the quasi-solid state electrolytes, a small amount of liquid electrolyte may be present to help improving the physical and ionic contact between the electrolyte and the electrode, thus reducing the interfacial resistance. Examples of QSSEs are disclosed in the following: U.S. Pat. No. 9,368,831 (Jun. 14, 2016); U.S. Pat. No. 9,601,803 (Mar. 21, 2017); U.S. Pat. No. 9,601,805 (Mar. 21, 2017); U.S. Pat. No. 9,059,481 (Jun. 16, 2015).

However, the presence of certain liquid electrolytes may cause some problems, such as liquid leakage, gassing, and low resistance to high temperature. Therefore, a novel electrolyte system that obviates all or most of these issues is needed.

Hence, a general object of the present disclosure is to provide a safe, flame/fire-resistant, quasi-solid or solid-state electrolyte system for a rechargeable lithium cell that is compatible with existing battery production facilities.

SUMMARY

The present disclosure provides a method of producing a rechargeable lithium battery cell comprising an anode, a cathode, a separator, and a quasi-solid or solid-state electrolyte in ionic communication with the anode and the cathode, wherein the method comprises (a) preparing a liquid electrolyte solution comprising an ion-conducting polymer dispersed or dissolved in a first liquid solvent and optionally a lithium salt dissolved in the first liquid solvent; (b) impregnating the electrolyte solution into the cathode, the anode, a porous structure of the separator, or the battery cell; (c) removing the first liquid solvent; and (d) impregnating a second liquid solvent, optionally comprising a lithium salt dissolved therein, into the cathode, the anode, the separator porous structure, or the battery cell; wherein the ion-conducting polymer comprises a polymer having an ion conductivity from $10^{-8}$ S/cm to $10^{-2}$ S/cm (preferably greater than $10^{-6}$ S/cm and further preferably greater than $10^{-4}$ S/cm) when measured at room temperature without the presence of a liquid solvent and the polymer does not occupy more than 30% by weight of the cathode (preferably less than 20%, further preferably less than 10%, and most preferably less than 5% polymer), not counting the current collector weight, and a second liquid solvent-to-polymer ratio is from 1/100 to 95/5 (preferably from 10/90 to 70/30). Typically, the second liquid solvent has a higher flash point, a lower vapor pressure, or a higher flash point as compared with the first liquid solvent or the second liquid solvent has a flash point higher than 200° C. Further, at least one of the first liquid solvent and the second liquid solvent, or both, contains from 0.1% to 50% by weight of a lithium salt relative to the ion-conducting polymer weight. Preferably, the polymer contains 1-35% by weight of the lithium salt dispersed therein.

In certain embodiments, the second liquid solvent comprises a solvent selected from the group consisting of fluorinated ethers, fluorinated esters, sulfones, sultones, sulfides, sulfites, nitriles, sulfates, siloxanes, silanes, phosphates, phosphonates, phosphinates, phosphines, phosphine oxides, phosphonic acids, phosphorous acid, phosphites, phosphoric acids, phosphazene compounds, ionic liquids, derivatives thereof, and combinations thereof.

Preferably, the ion-conducting polymer is selected from (but not limited to) poly(ethylene oxide), polypropylene oxide, polyoxymethylene, polyvinyl carbonate, polypropylene carbonate, poly(ethylene glycol), poly(acrylonitrile), poly(methyl methacrylate), poly(vinylidene fluoride), poly bis-methoxy ethoxyethoxide-phosphazene, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer with a carboxylate anion, a sulfonylimide anion, or sulfonate anion, poly(ethylene glycol) diacrylate, poly(ethylene glycol) methyl ether acrylate, polyurethane, polyurethane-urea, polyacrylamide, a polyionic liquid, polymerized 1,3-dioxolane, polyepoxide ether, polysiloxane, polyphosphazene, polyphosphate, polyphosphonate, polyphosphinate, polyphosphine, polyphosphine oxide, poly(phosphonic acid) (also including poly(vinyl phosphonic acid)), polymerized phosphorous acid, polymerized phosphite, poly(phosphoric acid), polymethacrylate, poly(acrylonitrile-butadiene), polynorbornene, poly(hydroxyl styrene), poly(ether ether ketone), polypeptoid, poly(ethylene-maleic anhydride), polycaprolactone, poly(trimethylene carbonate), a copolymer thereof, a sulfonated derivative thereof, or a combination thereof.

There are no particular restrictions on the selection of the first liquid solvent, but preferably the first liquid solvent is capable of dissolving a high amount of the intended ion-conducting polymer and a high amount of the intended lithium salt. In certain embodiments, the first liquid solvent is selected from the group consisting of vinylene carbonate (VC), ethylene carbonate (EC), propylene carbonate (PC), 1,2-dimethoxyethane (DME), 2-ethoxyethyl ether (EEE), sulfolane, dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), allyl ethyl carbonate (AEC), fluoroethylene carbonate (FEC), vinyl sulfite, vinyl ethylene sulfite, vinyl ethylene carbonate, 1,3-propyl sultone, 1,3,5-trioxane (TXE), 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, dinitriles, acrylonitrile (AN), acetone, acetonitrile, tetrahydrofuran (THF), alcohols, sulfates, siloxanes, silanes, N-methylacetamide, acrylates, ethylene glycols, phosphates, phosphonates, phosphinates, phosphines, phosphine oxides, phosphonic acids, phosphorous acid, phosphites, phosphoric acids, phosphazene compounds, derivatives thereof, and combinations thereof.

In the conventional lithium-ion battery or lithium metal battery industry, some of the organic liquid solvents listed above are commonly used as a solvent to dissolve a lithium salt therein and the resulting solutions are used as a liquid electrolyte. These liquid solvents are capable of dissolving a high amount of a lithium salt; however, many of them are highly volatile, having a low flash point and high flammability.

It is uniquely advantageous to be able to solidify the polymer by removing the volatile first liquid solvent once the liquid electrolyte (having a polymer and a lithium salt dissolved in the first liquid solvent) is injected into an electrode (anode or cathode), a porous separator structure, or a dry battery cell. With such a novel strategy, one can readily reduce the volatile liquid solvent or completely eliminate the volatile liquid solvent all together to bring the ion-conducting polymer to a solid state having a lithium salt dispersed therein to form a "salt-in-polymer" structure.

A desired amount of a second liquid solvent, preferably a flame-resistant liquid solvent, such as an ionic liquid or a flame retardant liquid, is then impregnated into the cathode, the anode, the separator layer, or the entire battery cell to improve the lithium ion conductivity of the electrolyte. This strategy enables us to achieve several desirable attributes of the resultant electrolyte: no liquid electrolyte leakage issue (the in situ solidified polymer being capable of holding the liquid together to form a gel), adequate lithium salt amount, good lithium ion conductivity, reduced or eliminated flammability, good ability of the electrolyte to wet the surfaces of anode/cathode active materials (hence, significantly reduced interfacial impedance and internal resistance), processing ease, compatibility with current lithium-ion battery production processes and equipment, etc. This is of significant utility value since most of the organic solvents commonly used in the lithium battery are known to be volatile and flammable, posing a fire and explosion danger. Further, current solid-state electrolytes are not compatible with existing lithium-ion battery manufacturing equipment and processes.

In certain preferred embodiments, the second liquid solvent comprises an ionic liquid. The ionic liquid may be preferably selected from the group consisting of room temperature ionic liquids having a cation selected from tetraalkylammonium, di-, tri-, or tetra-alkylimidazolium, alkylpyridinium, dialkyl-pyrrolidinium, dialkylpiperidinium, tetraalkylphosphonium, hexakis(bromomethyl)benzene, and trialkylsulfonium, 1-vinyl-3-dodecyl imidazolium bis(trifluoromethanesulfonyl) imide (VDIM-TFSI) or 1-vinyl-3-methylimidazolium bis[(trifluoromethyl)sulfonyl]imide (VMIMTFSI), 1-ethyl-3-methylimidazolium bis(trifluoromethanesulfonyl) imide (EMITFSI), [(poly(diallyldimethyl ammonium bis(fluorosulfonyl)imide, $(C_{10}H_{16}F_2N_2O_4S_2)n$, vinylimidazolium monomers with N-alkyl substituents, and combinations thereof.

In certain embodiments, the ionic liquid has an anion selected from $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

In certain preferred embodiments, the second liquid solvent comprises a flame retardant selected from an organic phosphorus compound, an inorganic phosphorus compound, a halogenated derivative thereof, or a combination thereof. The organic phosphorus compound or the inorganic phosphorus compound preferably is selected from the group consisting of phosphates, phosphonates, phosphonic acids, phosphorous acids, phosphites, phosphoric acids, phosphinates, phosphines, phosphine oxides, phosphazene compounds, derivatives thereof, and combinations thereof.

In certain preferred embodiments, the second liquid solvent comprises a liquid solvent selected from the group consisting of fluorinated ethers, fluorinated esters, sulfones, sulfides, nitriles, sulfates, siloxanes, silanes, combinations thereof, and combinations with phosphates, phosphonates, phosphinates, phosphines, phosphine oxides, phosphonic acids, phosphorous acid, phosphites, phosphoric acids, phosphazene compounds, derivatives thereof, and combinations thereof.

In some embodiments, the second liquid solvent is selected from a phosphate, phosphonate, phosphinate, phosphine, or phosphine oxide having the structure of:

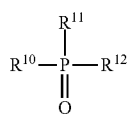

wherein $R^{10}$, $R^{11}$, and $R^{12}$, are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, and the second liquid solvent is stable under an applied electrical potential no less than 4 V (preferably no less than 4.5 V).

In some embodiments, the second liquid solvent comprises a phosphoranamine having the structure of:

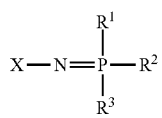

wherein $R^1$, $R^2$, and $R^3$ are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, wherein $R^1$, $R^2$, and $R^3$ are represented by at least two different substituents and wherein X is selected from the group consisting of an organosiylyl group or a tert-butyl group. The $R^1$, $R^2$, and $R^3$ may be each independently selected from the group consisting of an alkoxy group, and an aryloxy group.

In some embodiments, the polymer electrolyte exhibits a vapor pressure less than 0.001 kPa when measured at 20° C., a vapor pressure less than 10% of the vapor pressure of the combined second liquid solvent and lithium salt alone without the ion-conducting polymer, a flash point at least 100 degrees Celsius higher than a flash point of the second liquid solvent alone, a flash point higher than 200° C. (preferably higher than 300° C. or even higher than 400° C.), or no measurable flash point and wherein the electrolyte (polymer and the second liquid combined) has a lithium ion conductivity from $10^{-5}$ S/cm to $10^{-2}$ S/cm at room temperature.

The presence of this second liquid solvent is designed to impart certain desired properties to the polymer electrolyte, such as improved lithium ion conductivity, flame retardancy, and the ability of the electrolyte to permeate into the electrode (anode and/or cathode) to properly wet the surfaces of the anode active material and/or the cathode active material.

The second liquid solvent may comprise a mixture of an ionic liquid and an organic liquid wherein the organic liquid is selected from a fluorinated carbonate, hydrofluoroether, fluorinated ester, sulfone, nitrile, phosphate, phosphite, alkyl phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, dimethyl carbonate (DMC), methylethyl carbonate (MEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), or a combination thereof.

The second liquid solvents may include fluorinated liquid solvents; e.g., fluorinated vinyl carbonates, fluorinated vinyl monomers, fluorinated esters, fluorinated vinyl esters, and fluorinated vinyl ethers). Fluorinated vinyl esters include $R_fCO_2CH=CH_2$ and Propenyl Ketones, $R_fCOCH=CHCH_3$, where $R_f$ is F or any F-containing functional group (e.g., $CF_2$— and $CF_2CF_3$—).

Two examples of fluorinated vinyl carbonates are given below:

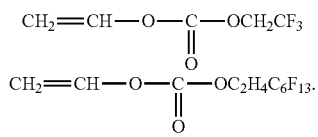

In some embodiments, the fluorinated carbonate is selected from vinyl- or double bond-containing variants of fluoroethylene carbonate (FEC), DFDMEC, FNPEC, hydrofluoro ether (HFE), trifluoro propylene carbonate (FPC), methyl nonafluorobutyl ether (MFE), or a combination thereof, wherein the chemical formulae for FEC, DFDMEC, and FNPEC, respectively are shown below:

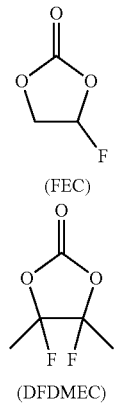

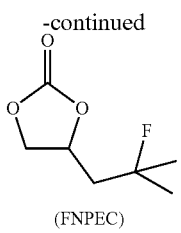

(FNPEC)

Desirable sulfones as a second liquid solvent include, but not limited to, alkyl and aryl vinyl sulfones or sulfides; e.g., ethyl vinyl sulfide, allyl methyl sulfide, phenyl vinyl sulfide, phenyl vinyl sulfoxide, ethyl vinyl sulfone, allyl phenyl sulfone, allyl methyl sulfone, and divinyl sulfone:

Poly(sulfone)s have high oxygen indices and low smoke emission on burning. Poly(sulfone)s are inherently self-extinguishing materials owing to their highly aromatic character. In certain embodiments, the sulfone as a second liquid solvent is selected from TrMS, MTrMS, TMS, or vinyl or double bond-containing variants of TrMS, MTrMS, TMS, EMS, MMES, EMES, EMEES, or a combination thereof; their chemical formulae being given below:

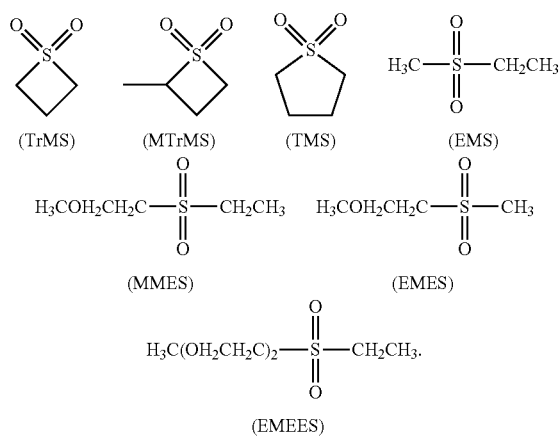

The second liquid solvent may be a nitrile preferably selected from mono-nitrile, acetone-nitrile, acrylonitrile, and/or a dinitrile, such as AND, GLN, and SEN, which have the following chemical formulae:

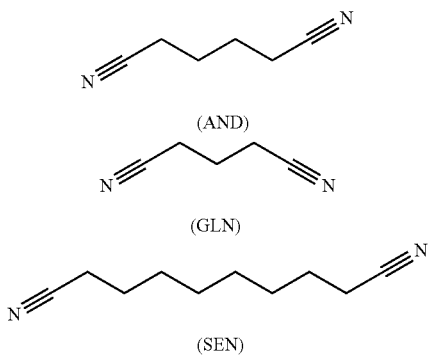

In some embodiments, the phosphate, phosphonate, phosphazene, phosphite, or sulfate, as a second liquid solvent is selected from tris(trimethylsilyl) phosphite (TTSPi), alkyl phosphate, triallyl phosphate (TAP), ethylene sulfate (DTD), a combination thereof. The phosphate, alkyl phosphonate, or phosphazene may be selected from the following:

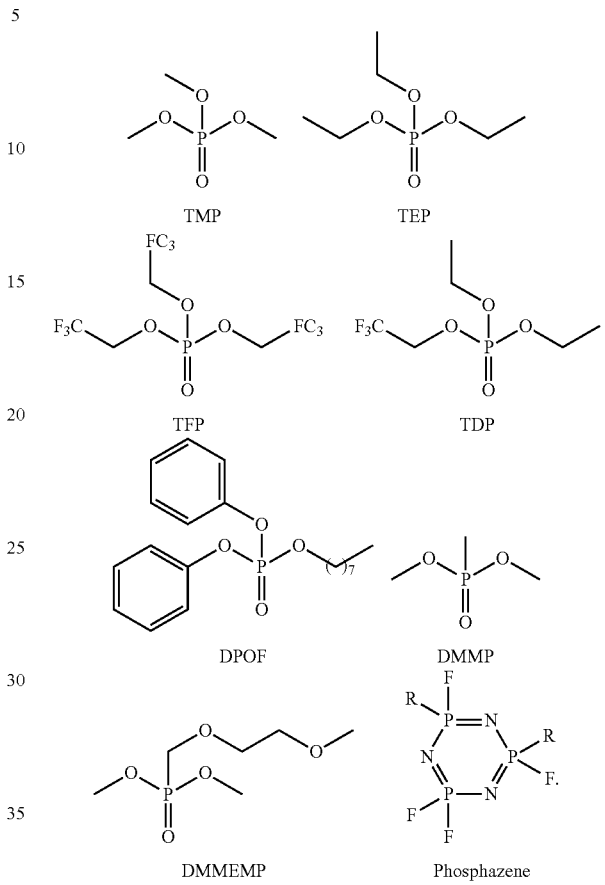

The phosphate, alkyl phosphonate, phosphonic acid, and phosphazene are flame-resistant. Good examples include diethyl vinylphosphonate, dimethyl vinylphosphonate, vinylphosphonic acid, diethyl allyl phosphate, and diethyl allylphosphonate:

The siloxane or silane in the second liquid solvent may be selected from alkylsiloxane (Si—O), alkylsilane (Si—C), liquid oligomeric silaxane (—Si—O—Si—), or a combination thereof.

In the disclosed polymer electrolyte, the lithium salt may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoromethanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

The cathode in the disclosed lithium cell typically comprises particles of a cathode active material and the electrolyte permeates into the cathode to come in physical contact with substantially all the cathode active material particles.

In some preferred embodiments, the battery cell contains substantially no liquid solvent left therein (substantially >99% of the liquid solvent being polymerized to become a polymer). However, it is essential to initially include a liquid solvent in the cell, enabling the lithium salt to get dissociated into lithium ions and anions. A majority (>50%, preferably >70%) or substantially all of the liquid solvents is then cured (polymerized or crosslinked). With less than 1% liquid solvent, the resulting electrolyte is a solid-state electrolyte. With less than 30% liquid solvent, we have a quasi-solid electrolyte. Both are highly flame-resistant.

A lower proportion of the liquid solvent in the electrolyte leads to a significantly reduced vapor pressure and increased flash point or completely eliminated flash point (un-detectable). Although typically by reducing the liquid solvent proportion one tends to observe a reduced lithium ion conductivity for the resulting electrolyte; however, quite surprisingly, after a threshold liquid solvent fraction, this trend is diminished or reversed (the lithium ion conductivity can actually increase with reduced liquid solvent in some cases).

In certain desirable embodiments, the separator or the cathode comprises particles of an inorganic solid electrolyte material having a particle size from 2 nm to 30 µm, wherein the particles of inorganic solid electrolyte material are dispersed in the ion-conducting polymer or chemically bonded by the polymer. The particles of inorganic solid electrolyte material are preferably selected from an oxide type, sulfide type, hydride type, halide type, borate type, phosphate type, lithium phosphorus oxynitride (LiPON), garnet-type, lithium superionic conductor (LISICON) type, sodium superionic conductor (NASICON) type, or a combination thereof. Such a composite composition is of particular utility value for use as a solid electrolyte separator disposed between an anode and a cathode.

The rechargeable lithium cell typically comprises a separator disposed between the anode and the cathode. Preferably, the separator comprises a quasi-solid or solid-state electrolyte as herein disclosed. In certain embodiments, the separator comprises polymeric fibers, ceramic fibers, glass fibers, or a combination thereof. These fibers may be stacked together in such a manner that there are pores that allow for permeation of lithium ions, but not for penetration of any potentially formed lithium dendrites. These fibers may be dispersed in a matrix material or bonded by a binder material. This matrix or binder material may contain a ceramic or glass material. The polymer electrolyte may serve as the matrix material or binder material that helps to hold these fibers together. The separator may contain particles of a glass or ceramic material (e.g., metal oxide, metal carbide, metal nitride, metal boride, etc.).

The present disclosure further provides a rechargeable lithium battery, including a lithium metal secondary cell, a lithium-ion cell, a lithium-sulfur cell, a lithium-ion sulfur cell, a lithium-selenium cell, or a lithium-air cell. This battery features a non-flammable, safe, and high-performing electrolyte as herein disclosed.

The ion-conducting polymer, along with a lithium salt, may be dissolved in a first liquid solvent to form an electrolyte solution, which can be injected into an electrode (e.g., a cathode) or a battery cell and then solidified in situ inside the electrode or the cell upon removal of the first liquid solvent. The resulting empty spaces left behind by the removed first liquid electrolyte may be re-filled with the second, non-flammable liquid electrolyte.

Alternatively, the electrolyte solution (comprising the needed lithium salt and an ion-conducting polymer dissolved in the first liquid solvent) may be mixed with an electrode active material (e.g., cathode active material particles, such as NCM, NCA and lithium iron phosphate), a conducting additive (e.g., carbon black, carbon nanotubes, expanded graphite flakes, or graphene sheets), and an optional flame-retardant agent and/or optional particles of an inorganic solid electrolyte to form a slurry or paste. The slurry or paste is then made into a desired electrode shape (e.g., cathode electrode), possibly supported on a surface of a current collector (e.g., an Al foil as a cathode current collector). The first liquid solvent may then be removed, followed by impregnation of a second liquid solvent (before or after the battery cell assembling). An anode of a lithium-ion cell may be made in a similar manner using an anode active material (e.g., particles of graphite, Si, SiO, etc.). The anode electrode, a cathode electrode, and a separator layer are then combined to form a battery cell. The first solvent inside the cell (if still present) is then removed, followed by injection of a second liquid solvent.

The liquid electrolyte composition is designed to permeate into the internal structure of the cathode and to be in physical contact or ionic contact with the cathode active material in the cathode, and to permeate into the anode electrode to be in physical contact or ionic contact with the anode active material where/if present.

As stated earlier, the disclosed method comprises (a) preparing a liquid electrolyte solution comprising an ion-conducting polymer dispersed or dissolved in a first liquid solvent and an optional lithium salt dissolved in the first liquid solvent; (b) impregnating the electrolyte solution into the cathode, the anode, a porous structure of the separator, or the battery cell; (c) removing the first liquid solvent; and (d) impregnating a second liquid solvent, optionally comprising a lithium salt dissolved therein, into the cathode, the anode, the separator porous structure, or the battery cell.

In certain embodiments, the method comprises impregnating the electrolyte solution into at least one of the cathode, the anode, and the separator, which is followed by the step of removing the first liquid solvent prior to or after a step of combining the cathode, the anode, and the separator into a battery cell.

In some embodiment, the method comprises impregnating the electrolyte solution into the cathode, removing the first liquid solvent, optionally compressing the cathode, impregnating the second liquid solvent into the cathode prior to or after the step of combining the cathode, the anode, and the separator into a battery cell.

The method may further comprise a step of impregnating the electrolyte solution into the anode, removing the first liquid solvent, optionally compressing the anode, impregnating the second liquid solvent into the anode prior to or after a step of combining the cathode, the anode, and the separator into a battery cell.

In certain embodiments, the cathode is made by combining particles of a cathode active material, a conductive additive, and a resin binder that bonds the cathode active material particles and the conductive additive together to form a cathode active layer having pores and wherein the pores are filled with the ion-conducting polymer and the second liquid solvent wherein the ion-conducting polymer is different than the resin binder in chemical composition or structure.

Alternatively, the cathode is made by combining particles of a cathode active material, a conductive additive, and the ion-conducting polymer that bonds the cathode active material particles and the conductive additive together to form a cathode active layer wherein the ion-conducting polymer, containing a lithium salt dispersed therein, also forms a substantially continuous or contiguous phase to serve as an electrolyte and the cathode does not contain an additional resin binder.

In some embodiments, the anode is made by combining particles of an anode active material, a conductive additive, and a resin binder that bonds the anode active material particles and the conductive additive together to form an anode active layer having pores and wherein the pores are filled with the ion-conducting polymer and the second liquid solvent wherein the ion-conducting polymer is different than the resin binder in chemical composition or structure.

Alternatively, the anode is made by combining particles of an anode active material, a conductive additive, and the ion-conducting polymer that bonds the anode active material particles and the conductive additive together to form an anode active layer wherein the ion-conducting polymer, containing a lithium salt dispersed therein, also forms a substantially continuous or contiguous phase to serve as an electrolyte and the anode does not contain an additional resin binder.

The present disclosure also provides a method of producing a rechargeable lithium battery, wherein the method comprises the steps of (i) forming a battery cell; (ii) impregnating an electrolyte solution into the cathode, the anode, a porous structure of the separator, or the battery cell, wherein the electrolyte solution comprises an ion-conducting polymer and a lithium salt dissolved in a first liquid solvent; (iii) partially or fully removing the first liquid solvent to generate empty spaces; and (iv) impregnating a second liquid solvent into the empty spaces, wherein the second liquid solvent comprises a flame-retardant or has a higher flash point than the first liquid solvent.

The flash point of the quasi-solid electrolyte (the ion-conducting polymer mixed with the second liquid solvent) is typically at least 100 degrees higher than the flash point of the first organic liquid solvent or the second liquid solvent without the presence of the ion-conducting polymer. In most of the cases, either the flash point is higher than 200° C. or no flash point can be detected. The electrolyte just would not catch on fire or get ignited. Any accidentally initiated flame does not sustain for longer than a few seconds. This is a highly significant discovery, considering the notion that fire and explosion concern has been a major impediment to widespread acceptance of battery-powered electric vehicles. This new technology could potentially reshape the landscape of EV industry.

Still another preferred embodiment of the present disclosure is a rechargeable lithium-sulfur cell or lithium-ion sulfur cell containing a sulfur cathode having sulfur or lithium polysulfide as a cathode active material.

For a lithium metal cell (where lithium metal is the primary active anode material), the anode current collector may comprise a foil, perforated sheet, or foam of a metal having two primary surfaces wherein at least one primary surface is coated with or protected by a layer of lithiophilic metal (a metal capable of forming a metal-Li solid solution or is wettable by lithium ions), a layer of graphene material, or both. The metal foil, perforated sheet, or foam is preferably selected from Cu, Ni, stainless steel, Al, graphene-coated metal, graphite-coated metal, carbon-coated metal, or a combination thereof. The lithiophilic metal is preferably selected from Au, Ag, Mg, Zn, Ti, K, Al, Fe, Mn, Co, Ni, Sn, V, Cr, an alloy thereof, or a combination thereof.

For a lithium ion battery featuring the presently disclosed electrolyte, there is no particular restriction on the selection of an anode active material. The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, $ZnCo_2O_4$; (f) carbon or graphite particles (g) prelithiated versions thereof; and (h) combinations thereof.

In some embodiments, the anode active material contains a prelithiated Si, prelithiated Ge, prelithiated Sn, prelithiated $SnO_x$, prelithiated $SiO_x$, prelithiated iron oxide, prelithiated $V_2O_5$, prelithiated $V_3O_8$, prelithiated $Co_3O_4$, prelithiated $Ni_3O_4$, or a combination thereof, wherein x=1 to 2.

The rechargeable lithium cell may further comprise a cathode current collector selected from aluminum foil, carbon- or graphene-coated aluminum foil, stainless steel foil or web, carbon- or graphene-coated steel foil or web, carbon or graphite paper, carbon or graphite fiber fabric, flexible graphite foil, graphene paper or film, or a combination thereof. A web means a screen-like structure or a metal foam, preferably having interconnected pores or through-thickness apertures.

These and other advantages and features of the present disclosure will become more transparent with the description of the following best mode practice and illustrative examples.

DETAILED DESCRIPTION

Figure 1A:
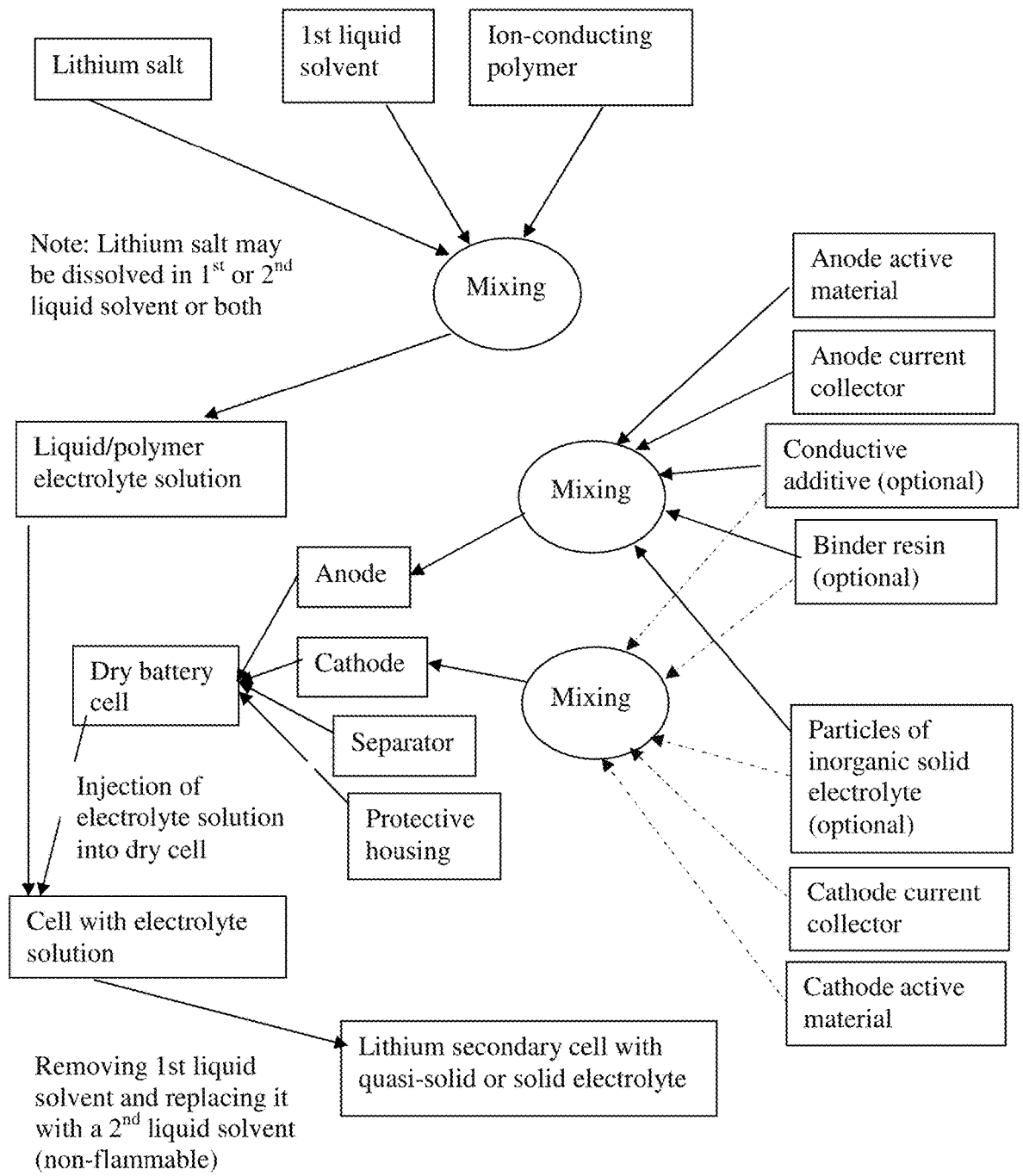
FIG. 1(A) A process flow chart to illustrate a method of producing a lithium-ion battery comprising a quasi-solid-state electrolyte according to some embodiments of the present disclosure.

The present disclosure provides a safe and high-performing lithium battery, which can be any of various types of lithium-ion cells or lithium metal cells. A high degree of safety is imparted to this battery by a novel and unique electrolyte that is highly flame-resistant and would not initiate a fire or sustain a fire and, hence, would not pose explosion danger. This disclosure has solved the very most critical issue that has plagued the lithium-metal and lithium-ion industries for more than two decades.

As indicated earlier in the Background section, a strong need exists for a safe, non-flammable, yet injectable quasi-solid electrolyte or solid-state electrolyte system for a rechargeable lithium cell that is compatible with existing battery production facilities. It is well-known in the art that the conventional solid-state electrolyte batteries typically cannot be produced using existing lithium-ion battery production equipment or processes.

The present disclosure provides a method of producing a rechargeable lithium battery comprising an anode, a cathode, and a quasi-solid electrolyte in ionic communication with the anode and the cathode, wherein the electrolyte comprises a polymer impregnated or infiltrated with a flame-resistant liquid solvent.

In certain preferred embodiments, the method comprises (a) preparing a liquid electrolyte solution comprising an ion-conducting polymer dispersed or dissolved in a first liquid solvent and an optional lithium salt dissolved in the first liquid solvent; (b) impregnating the electrolyte solution into the cathode, the anode, a porous structure of the separator, or the battery cell; (c) removing the first liquid solvent; and (d) impregnating a second liquid solvent, optionally comprising a lithium salt dissolved therein, into the cathode, the anode, the separator porous structure, or the battery cell; wherein the ion-conducting polymer comprises a polymer having an ion conductivity from $10^{-8}$ S/cm to $10^{-2}$ S/cm (preferably greater than $10^{-6}$ S/cm and further preferably greater than $10^{-4}$ S/cm) when measured at room temperature without the presence of a liquid solvent and the polymer does not occupy more than 25% by weight of the cathode, not counting the current collector weight, and a second liquid solvent-to-polymer ratio is from 1/100 to 95/5. Typically, the second liquid solvent has a higher flash point, a lower vapor pressure, or a higher flash point as compared with the first liquid solvent or the second liquid solvent has a flash point higher than 200° C. Further, at least one of the first liquid solvent and the second liquid solvent, or in combination, contains from 0.1% to 50% by weight of a lithium salt relative to the ion-conducting polymer weight. Preferably, the polymer contains 1-35% by weight of the lithium salt dispersed therein.

In certain embodiments, the second liquid solvent comprises a flame-resistant solvent selected from the group consisting of fluorinated ethers, fluorinated esters, sulfones, sultones, sulfides, sulfites, nitriles, sulfates, siloxanes, silanes, phosphates, phosphonates, phosphinates, phosphines, phosphine oxides, phosphonic acids, phosphorous acid, phosphites, phosphoric acids, phosphazene compounds, ionic liquids, derivatives thereof, and combinations thereof.

The first liquid solvent is designed or selected to have the ability to dissolve a good amount of a lithium salt (e.g., 1-50% by weight) and a good amount of an ion-conducting polymer (e.g., 0.1%-30% by weight). However, such a liquid solvent tends to have a relatively low flash point and, hence, should be replaced by a flame-resistant second liquid solvent.

Preferably, the ion-conducting polymer is selected from (but not limited to) poly(ethylene oxide), polypropylene oxide, polyoxymethylene, polyvinylene carbonate, polypropylene carbonate, poly(ethylene glycol), poly(acrylonitrile), poly(methyl methacrylate), poly(vinylidene fluoride), poly bis-methoxy ethoxyethoxide-phosphazene, polyvinyl chloride, polydimethylsiloxane, poly(vinylidene fluoride)-hexafluoropropylene, cyanoethyl poly(vinyl alcohol), a pentaerythritol tetraacrylate-based polymer, an aliphatic polycarbonate, a single Li-ion conducting solid polymer with a carboxylate anion, a sulfonylimide anion, or sulfonate anion, poly(ethylene glycol) diacrylate, poly(ethylene glycol) methyl ether acrylate, polyurethane, polyurethan-urea, polyacrylamide, a polyionic liquid, polymerized 1,3-dioxolane, polyepoxide ether, polysiloxane, polyphosphazene, polyphosphate, polyphosphonate, polyphosphinate, polyphosphine, polyphosphine oxide, poly(phosphonic acid), polymerized phosphorous acid, polymerized phosphite, poly (phosphoric acid), polymethacrylate, poly(acrylonitrile-butadiene), polynorbornene, poly(hydroxyl styrene), poly (ether ether ketone), polypeptoid, poly(ethylene-maleic anhydride), polycaprolactone, poly(trimethylene carbonate), a copolymer thereof, a sulfonated derivative thereof, or a combination thereof.

In certain embodiments, the first liquid solvent is selected from the group consisting of vinylene carbonate (VC), ethylene carbonate (EC), propylene carbonate (PC), 1,2-dimethoxyethane (DME), 2-ethoxyethyl ether (EEE), sulfolane, dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), allyl ethyl carbonate (AEC), fluoroethylene carbonate (FEC), vinyl sulfite, vinyl ethylene sulfite, vinyl ethylene carbonate, 1,3-propyl sultone, 1,3,5-trioxane (TXE), 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, dinitriles, acrylonitrile (AN), acetone, acetonitrile, tetrahydrofuran (THF), alcohols, sulfates, siloxanes, silanes, N-methylacetamide, acrylates, ethylene glycols, phosphates, phosphonates, phosphinates, phosphines, phosphine oxides, phosphonic acids, phosphorous acid, phosphites, phosphoric acids, phosphazene compounds, derivatives thereof, and combinations thereof.

The method may comprise impregnating the electrolyte solution (comprising a lithium salt and an ion-conducting polymer dissolved in the first liquid solvent) into at least one of the cathode, the anode, and the separator. For a lithium-ion cell, this electrolyte solution is preferably allowed to impregnate into both the anode active layer and the cathode active layer. If the separator layer initially contains a porous structure (e.g., a nonwoven fabric of polymer fibers or ceramic particles bonded by a resin), this porous structure is preferably impregnated with this electrolyte solution as well. This step may be followed by a step of removing the first liquid solvent prior to or after a step of combining the cathode, the anode, and the separator into a battery cell. Certain embodiments of this method are schematically illustrated in FIG. 1(B) and FIG. 1(C).

In some embodiment, the method comprises impregnating the electrolyte solution into the cathode, removing the first liquid solvent, optionally compressing the cathode (e.g., for the purpose of reducing the porosity in the cathode), impregnating the second liquid solvent into the cathode prior to or after the step of combining the cathode, the anode, and the separator into a battery cell.

The method may further comprise a step of impregnating the electrolyte solution into the anode, removing the first liquid solvent, optionally compressing the anode, impregnating the second liquid solvent into the anode prior to or after a step of combining the cathode, the anode, and the separator into a battery cell.

In certain embodiments, the cathode is made by combining particles of a cathode active material, a conductive additive, and a resin binder that bonds the cathode active material particles and the conductive additive together to form a cathode active layer having pores. These pores are then infiltrated or impregnated with the electrolyte solution, followed by removing the first liquid solvent to solidify the polymer but still leave behind some pores. The pores are then further filled with the second liquid solvent, which is substantially non-flammable. In this situation, the pores are filled with both the ion-conducting polymer and the second liquid solvent wherein the ion-conducting polymer is different than the resin binder in chemical composition or structure. This represents an embodiment illustrated in FIG. 1(C).

Alternatively, the cathode is made by combining particles of a cathode active material, a conductive additive, and the ion-conducting polymer that bonds the cathode active material particles and the conductive additive together to form a cathode active layer wherein the ion-conducting polymer, containing a lithium salt dispersed therein, also forms a substantially continuous or contiguous phase to serve as an electrolyte and the cathode does not contain an additional resin binder. This represents an embodiment illustrated in FIG. 1(B).

In some embodiments, the anode is made by combining particles of an anode active material, a conductive additive, and a resin binder that bonds the anode active material particles and the conductive additive together to form an anode active layer having pores. These pores are then infiltrated or impregnated with the electrolyte solution, followed by removing the first liquid solvent to solidify the polymer but still leave behind some pores. The pores are then further filled with the second liquid solvent, which is substantially non-flammable. In this situation, the pores in the anode active layer are filled with both the ion-conducting polymer and the second liquid solvent wherein the ion-conducting polymer is different than the resin binder in chemical composition or structure.

Alternatively, the anode is made by combining particles of an anode active material, a conductive additive, and the ion-conducting polymer that bonds the anode active material particles and the conductive additive together to form an anode active layer wherein the ion-conducting polymer, containing a lithium salt dispersed therein, also forms a substantially continuous or contiguous phase to serve as an electrolyte and the anode does not contain an additional resin binder.

Figure 1B:
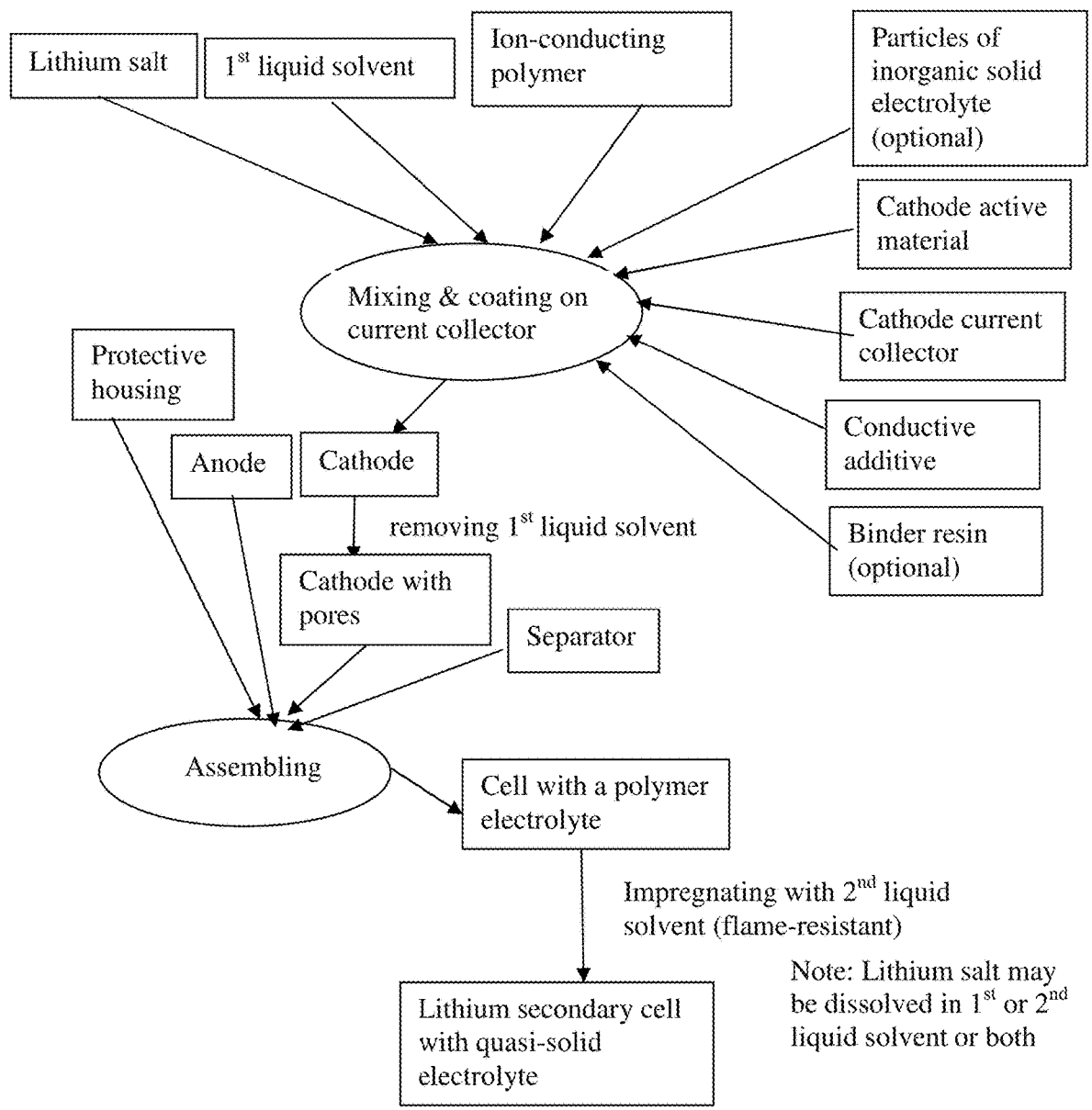
FIG. 1(B) A process flow chart to illustrate a method of producing a lithium battery comprising a quasi-solid-state electrolyte according to some embodiments of the present disclosure.
Figure 1C:
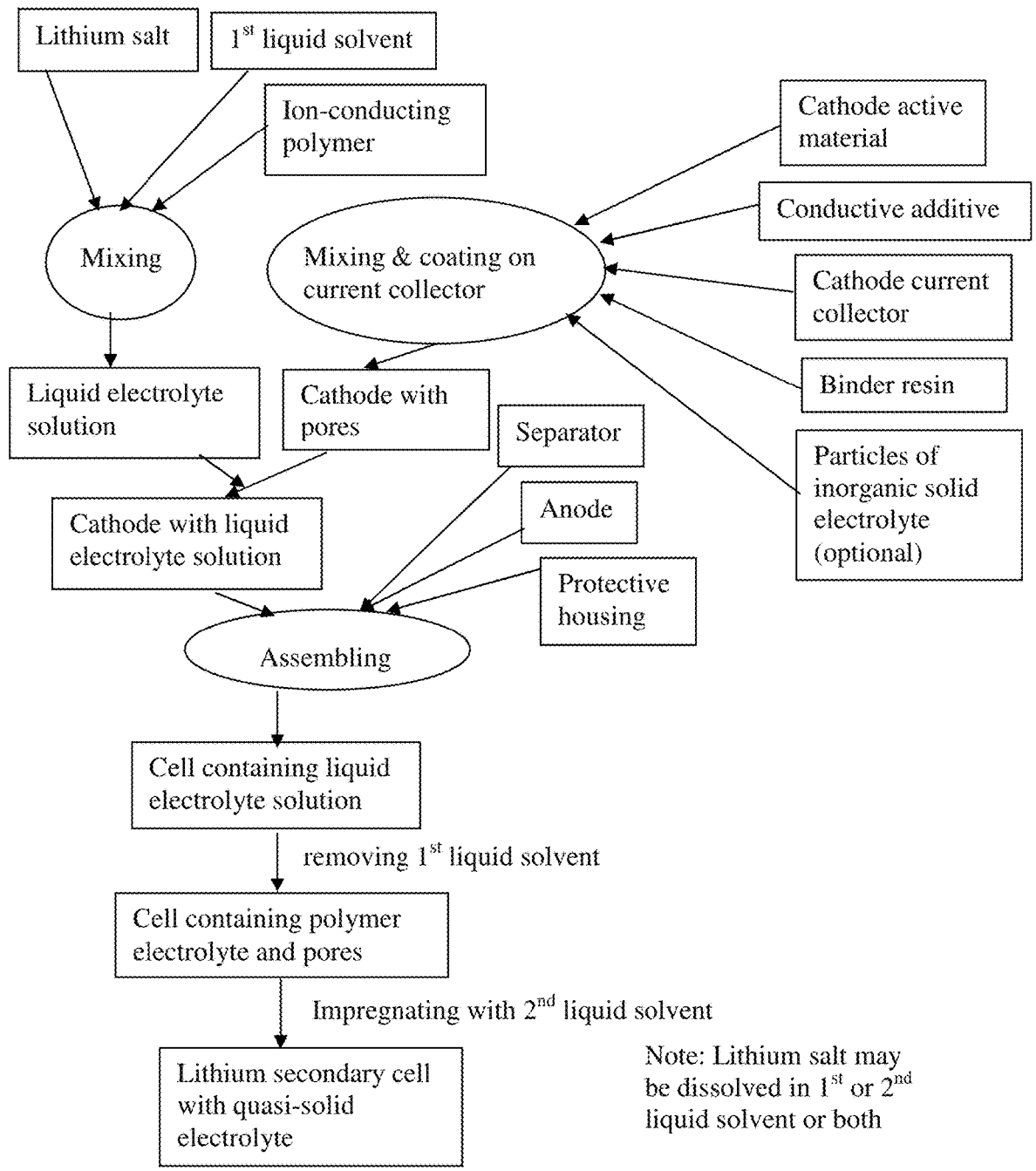
FIG. 1(C) A process flow chart to illustrate a method of producing a lithium metal battery comprising a quasi-solid-state electrolyte according to some embodiments of the present disclosure.

The disclosure further provides a method of producing a rechargeable lithium cell (as illustrated in FIG. 1(A)), the method comprising: (a) providing a cathode; (b) providing an anode; (c) combining the cathode and the anode, along with a porous separator layer, to form a dry cell; and (d) introducing (e.g., injecting) an electrolyte solution (containing a lithium salt and an ion-conducting polymer dissolved in a first liquid solvent) into the dry cell. All these procedures, from (a) to (d), are similar to the procedures used in the production of the conventional lithium-ion cells and, as such, the presently disclosed lithium cells can be produced using current lithium-ion cell production equipment which has been tested and proven for 40 years. Step (d) further comprises removing the first liquid solvent and re-filling the cell with a second, more flame-resistant liquid solvent to produce the rechargeable lithium cell.

In this method, step (a) may be selected from any commonly used cathode production process. For instance, the process may include (i) mixing particles of a cathode active material, a conductive additive, an optional resin binder, optional particles of a solid inorganic electrolyte powder, and an optional flame retardant in a liquid medium (e.g., an organic solvent, such as NMP) to form a slurry; and (ii) coating the slurry on a cathode current collector (e.g., an Al foil) and removing the solvent. The anode in step (b) may be produced in a similar manner, but using particles of an anode active material (e.g., particles of Si, SiO, Sn, $SnO_2$, graphite, and carbon). The liquid medium used in the production of an anode may be water or an organic solvent. Step (c) may entail combining the anode, a porous separator, the cathode, along with their respective current collectors, to form a unit cell which is enclosed in a protective housing to form a dry cell.

In some preferred embodiments, the second liquid solvent comprises an ionic liquid. The ionic liquid is typically composed of ions only. Ionic liquids are low melting temperature salts that are in a molten or liquid state when above a desired temperature. For instance, an ionic salt is considered as an ionic liquid if its melting point is below 100° C. If the melting temperature is equal to or lower than room temperature (25° C.), the salt is referred to as a room temperature ionic liquid (RTIL). The IL-based lithium salts are characterized by weak interactions, due to the combination of a large cation and a charge-delocalized anion. This results in a low tendency to crystallize due to flexibility (anion) and asymmetry (cation).

Some ILs may be used as a co-solvent (not as a salt) to work with the first organic solvent of the present disclosure. A well-known ionic liquid is formed by the combination of a 1-ethyl-3-methyl-imidazolium (EMI) cation and an N,N-bis(trifluoromethane)sulphonamide (TFSI) anion. This combination gives a fluid with an ionic conductivity comparable to many organic electrolyte solutions, a low decomposition propensity and low vapor pressure up to ~300-400° C. This implies a generally low volatility and non-flammability and, hence, a much safer electrolyte solvent for batteries.

Ionic liquids are basically composed of organic or inorganic ions that come in an unlimited number of structural variations owing to the preparation ease of a large variety of their components. Thus, various kinds of salts can be used to design the ionic liquid that has the desired properties for a given application. These include, among others, imidazolium, pyrrolidinium and quaternary ammonium salts as cations and bis(trifluoromethanesulphonyl) imide, bis(fluorosulphonyl)imide and hexafluorophosphate as anions. Useful ionic liquid-based lithium salts (not solvent) may be composed of lithium ions as the cation and bis(trifluoromethanesulphonyl)imide, bis(fluorosulphonyl)imide and hexafluorophosphate as anions. For instance, lithium trifluoromethanesulfonimide (LiTFSI) is a particularly useful lithium salt.

Based on their compositions, ionic liquids come in different classes that include three basic types: aprotic, protic and zwitterionic types, each one suitable for a specific application. Common cations of room temperature ionic liquids (RTILs) include, but are not limited to, tetraalkylammonium, di, tri, and tetra-alkylimidazolium, alkylpyridinium, dialkyl-pyrrolidinium, dialkylpiperidinium, tetraalkylphosphonium, and trialkylsulfonium. Common anions of RTILs include, but are not limited to, $BF_4^-$, $B(CN)_4^-$, $CH_3BF_3^-$, $CH_2CHBF_3^-$, $CF_3BF_3^-$, $C_2F_5BF_3^-$, $n$-$C_3F_7BF_3^-$, $n$-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, etc. Relatively speaking, the combination of imidazolium- or sulfonium-based cations and complex halide anions such as $AlCl_4^-$, $BF_4^-$, $CF_3CO_2^-$, $CF_3SO_3^-$, $NTf_2^-$, $N(SO_2F)_2^-$, or $F(HF)_{2.3}^-$ results in RTILs with good working conductivities.

RTILs can possess archetypical properties such as high intrinsic ionic conductivity, high thermal stability, low volatility, low (practically zero) vapor pressure, non-flammability, the ability to remain liquid at a wide range of temperatures above and below room temperature, high polarity, high viscosity, and wide electrochemical windows. These properties, except for the high viscosity, are desirable attributes when it comes to using an RTIL as an electrolyte co-solvent in a rechargeable lithium cell.

In the conventional lithium-ion battery or lithium metal battery industry, the first liquid solvents are commonly used as a solvent to dissolve a lithium salt therein and the resulting solutions are used as a liquid electrolyte. These liquid solvents are typically capable of dissolving a high amount of a lithium salt; however, they are typically highly volatile, having a low flash point and being highly flammable.

It is highly advantageous to be able to solidify the polymer by removing the first liquid solvent once the liquid electrolyte (having a lithium salt and an ion-conducting polymer dissolved in the first liquid solvent) is injected into an electrode or a battery cell. The lithium salt is readily dissociated into lithium ions and corresponding anions, which could remain separated and dispersed in a matrix of polymer chains. With such an innovative strategy, one can readily reduce the liquid solvent or completely eliminate the volatile liquid solvent all together. A desired amount of a second liquid solvent, containing an ionic liquid or a flame-resistant organic liquid solvent, may be impregnated into the electrodes or the battery cell to improve the lithium ion conductivity of the electrolyte. Desirable flame retardant-type liquid solvents are, as examples, alkyl phosphates, alkyl phosphonates, phosphazenes, hydrofluoroethers, fluorinated ethers, and fluorinated esters.

This strategy enables us to achieve several desirable features of the resultant electrolytes and batteries:
a) no liquid electrolyte leakage issue (the in situ solidified polymer being capable of holding the second liquid together to form a gel);
b) adequate lithium salt amount can be dissolved in the electrolyte, enabling a good lithium-ion conductivity;
c) reduced or eliminated flammability (only a solid polymer and a non-flammable second liquid are retained in the cell);
d) good ability of the electrolyte to wet the surfaces of anode/cathode active materials (hence, significantly reduced interfacial impedance and internal resistance);
e) processing ease and compatibility with current lithium-ion battery production processes and equipment; and
f) enabling a high cathode active material proportion in the cathode electrode (typically 75-97%, in contrast to typically less than 75% by weight of the cathode active material when working with a conventional solid polymer electrolyte or inorganic solid electrolyte.

This disclosed in situ-solidified polymer electrolyte approach is of significant utility value since most of the organic solvents are known to be volatile and flammable, posing a fire and explosion danger. Further, current solid-state electrolytes are not compatible with existing lithium-ion battery manufacturing equipment and processes.

In certain preferred embodiments, the first or the second liquid solvent comprises a flame-resisting or flame-retardant liquid selected from an organic phosphorus compound, an inorganic phosphorus compound, a halogenated derivative thereof, or a combination thereof. The organic phosphorus compound or the inorganic phosphorus compound preferably is selected from the group consisting of phosphates, phosphonates, phosphonic acids, phosphorous acids, phosphites, phosphoric acids, phosphinates, phosphines, phosphine oxides, phosphazene compounds, derivatives thereof, and combinations thereof.

In certain embodiments, the second liquid solvent is selected from the group consisting of fluorinated ethers, fluorinated esters, sulfones, sulfides, nitriles, sulfates, siloxanes, silanes, phosphates, phosphonates, phosphinates, phosphines, phosphine oxides, phosphonic acids, phosphorous acid, phosphites, phosphoric acids, phosphazene compounds, derivatives thereof, and combinations thereof.

In some embodiments, the second liquid solvent is selected from a phosphate, phosphonate, phosphinate, phosphine, or phosphine oxide having the structure of:

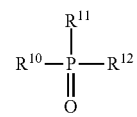

wherein $R^{10}$, $R^{11}$, and $R^{12}$, are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, and the second liquid solvent is stable under an applied electrical potential no less than 4 V.

In some embodiments, the second liquid solvent comprises a phosphoranamine having the structure of:

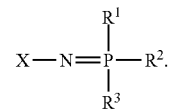

wherein $R^1$, $R^2$, and $R^3$ are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, wherein $R^1$, $R^2$, and $R^3$ are represented by at least two different substituents and wherein X is selected from the group consisting of an organosilyl group or a tert-butyl group. The $R^1$, $R^2$, and $R^3$ may be each independently selected from the group consisting of an alkoxy group, and an aryloxy group.

The polymer electrolyte typically has a lithium-ion conductivity typically from $10^{-8}$ S/cm to $10^{-2}$ S/cm at room temperature. The cathode may contain a cathode active material (along with a conductive additive and an optional resin binder) and a cathode current collector (such as Al foil) supporting the cathode active material. The anode may have an anode current collector, with or without an anode active material in the beginning when the cell is made. It may be noted that if no conventional anode active material, such as graphite, Si, SiO, Sn, and conversion-type anode materials, and no lithium metal is present in the cell when the cell is made and before the cell begins to charge and discharge, the battery cell is commonly referred to as an "anode-less" lithium cell.

It may be noted that these first liquid solvents, upon removal, the solidified polymer becomes essentially non-flammable. These liquid solvents are typically known to be useful for dissolving a lithium salt. In some preferred embodiments, the battery cell contains substantially no volatile liquid solvent therein. However, it is essential to initially include a liquid solvent in the cell, enabling the lithium salt to get dissociated into lithium ions and anions. A majority or substantially all of the first liquid solvent (particularly the organic solvent) is then removed and replaced with a second liquid solvent. With substantially 0% liquid solvent, the resulting electrolyte is a solid-state electrolyte. With less than 30% liquid solvent, we have a quasi-solid electrolyte. Both are highly flame-resistant.

In certain embodiments, the electrolyte exhibits a vapor pressure less than 0.001 kPa when measured at 20° C., a vapor pressure less than 60% of the vapor pressure of the combined first liquid solvent and lithium salt alone without the ion-conducting polymer, a flash point at least 100 degrees Celsius higher than a flash point of the liquid solvent solution without the polymer, a flash point higher than 200° C., or no measurable flash point and wherein the polymer has a lithium ion conductivity from $10^{-8}$ S/cm to $10^{-2}$ S/cm at room temperature.

A lower proportion of the second liquid solvent in the electrolyte leads to a significantly reduced vapor pressure and increased flash point or completely eliminated flash point (un-detectable). Although typically by reducing the liquid solvent proportion one tends to observe a reduced lithium-ion conductivity for the resulting electrolyte; however, quite surprisingly, after a threshold liquid solvent fraction, this trend is diminished or reversed (the lithium-ion conductivity can actually increase with reduced liquid solvent in some cases). The presence of this second liquid solvent is designed to impart certain desired properties to the polymerized electrolyte, such as lithium ion conductivity, flame retardancy, ability of the electrolyte to permeate into the electrode (anode and/or cathode) to properly wet the surfaces of the anode active material and/or the cathode active material.

In some embodiments, the second liquid solvent is selected from a fluorinated carbonate, hydrofluoroether, fluorinated ester, sulfone, nitrile, phosphate, phosphite, alkyl phosphonate, phosphazene, sulfate, siloxane, silane, 1,3-dioxolane (DOL), 1,2-dimethoxyethane (DME), tetraethylene glycol dimethylether (TEGDME), poly(ethylene glycol) dimethyl ether (PEGDME), diethylene glycol dibutyl ether (DEGDBE), 2-ethoxyethyl ether (EEE), sulfone, sulfolane, ethylene carbonate (EC), dimethyl carbonate (DMC), methylethyl carbonate (MEC), diethyl carbonate (DEC), ethyl propionate, methyl propionate, propylene carbonate (PC), gamma.-butyrolactone (γ-BL), acetonitrile (AN), ethyl acetate (EA), propyl formate (PF), methyl formate (MF), toluene, xylene, methyl acetate (MA), fluoroethylene carbonate (FEC), vinylene carbonate (VC), allyl ethyl carbonate (AEC), or a combination thereof.

Desirable first or second liquid solvents can include fluorinated monomers having unsaturation (double bonds or triple bonds) in the backbone or cyclic structure (e.g., fluorinated vinyl carbonates, fluorinated vinyl monomers, fluorinated esters, fluorinated vinyl esters, and fluorinated vinyl ethers). These chemical species may also be used as a second liquid solvent in the presently disclosed electrolyte. Fluorinated vinyl esters include $R_fCO_2CH=CH_2$ and Propenyl Ketones, $R_fCOCH=CHCH_3$, where $R_f$ is F or any F-containing functional group (e.g., $CF_2-$ and $CF_2CF_3-$).

Two examples of fluorinated vinyl carbonates are given below:

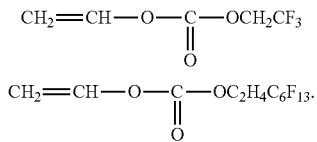

In some embodiments, the fluorinated carbonate is selected from vinyl- or double bond-containing variants of fluoroethylene carbonate (FEC), DFDMEC, FNPEC, hydrofluoro ether (HFE), trifluoro propylene carbonate (FPC), or methyl nonafluorobutyl ether (MFE), wherein the chemical formulae for FEC, DFDMEC, and FNPEC, respectively are shown below:

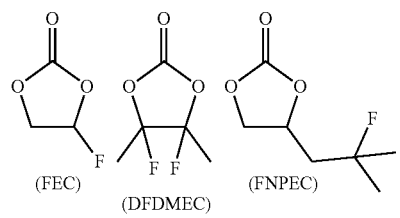

Desirable sulfones as a second liquid solvent include, but not limited to, alkyl and aryl vinyl sulfones or sulfides; e.g., ethyl vinyl sulfide, allyl methyl sulfide, phenyl vinyl sulfide, phenyl vinyl sulfoxide, ethyl vinyl sulfone, allyl phenyl sulfone, allyl methyl sulfone, and divinyl sulfone.

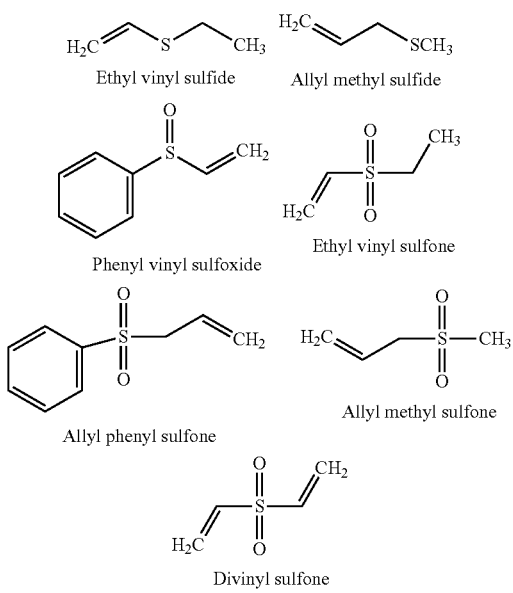

In certain embodiments, the sulfone is selected from TrMS, MTrMS, TMS, or vinyl or double bond-containing variants of TrMS, MTrMS, TMS, EMS, MMES, EMES, EMEES, or a combination thereof; their chemical formulae being given below:

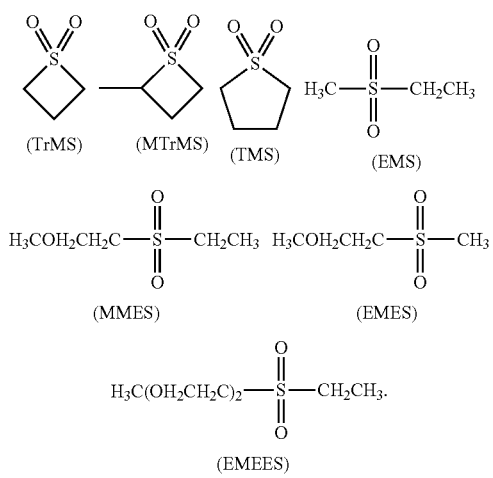

The nitrile as a second solvent may be selected from ADN, GLN, SEN, or a combination thereof and their chemical formulae are given below:

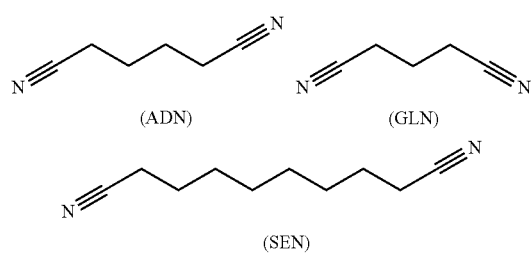

In some embodiments, the phosphate (including various derivatives of phosphoric acid), alkyl phosphonate, phosphazene, phosphite, or sulfate as a second liquid solvent is selected from tris(trimethylsilyl) phosphite (TTSPi), alkyl phosphate, triallyl phosphate (TAP), ethylene sulfate (DTD), a combination thereof, or a combination with 1,3-propane sultone (PS) or propene sultone (PES). The phosphate, alkyl phosphonate, or phosphazene may be selected from the following:

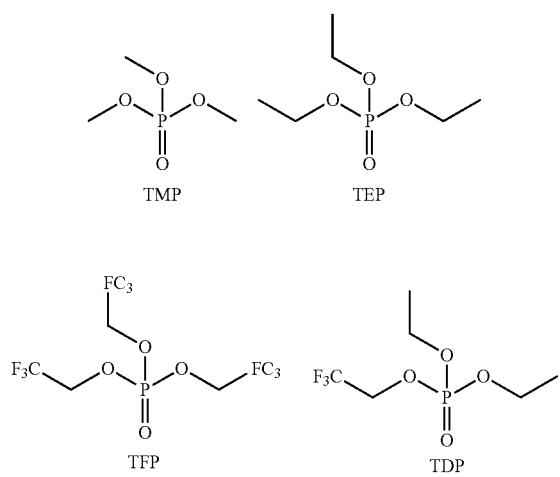

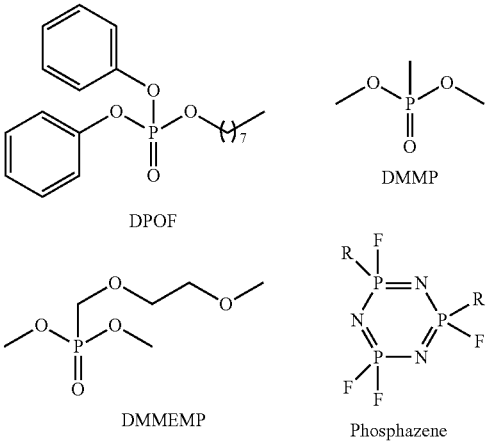

wherein R=H, $NH_2$, or $C_1$-$C_6$ alkyl.

Phosphonate moieties can be readily introduced into vinyl monomers to produce allyl-type, vinyl-type, styrenic-type and (meth)acrylic-type monomers bearing phosphonate groups (e.g., either mono or bisphosphonate). These liquid solvents may serve as a first or a second liquid solvent in the electrolyte composition. The phosphate, alkyl phosphonate, phosphonic acid, and phosphazene, upon polymerization, are found to be essentially non-flammable. Good examples include diethyl vinylphosphonate, dimethyl vinylphosphonate, vinylphosphonic acid, diethyl allyl phosphate, and diethyl allylphosphonate:

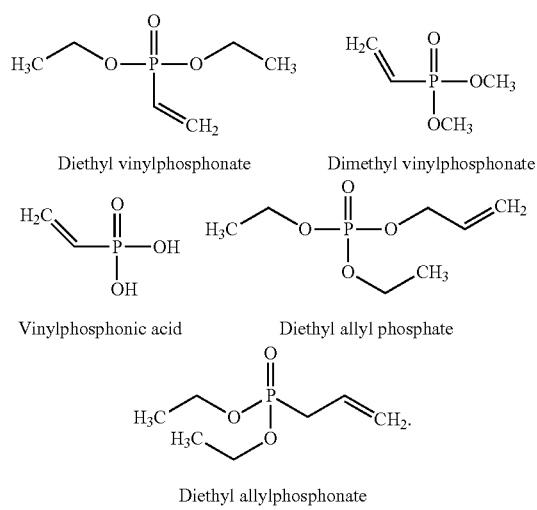

The second liquid solvent may comprise siloxane or silane selected from alkylsiloxane (Si—O), alkylsilane (Si—C), liquid oligomeric silaxane (—Si—O—Si—), or a combination thereof.

In the disclosed polymer electrolyte, the lithium salt may be selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoromethanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (Li- BETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

In certain desirable embodiments, the electrolyte further comprises particles of an inorganic solid electrolyte material having a particle size from 2 nm to 30 μm, wherein the particles of inorganic solid electrolyte material are dispersed in the polymer or chemically bonded by the polymer. The particles of inorganic solid electrolyte material are preferably selected from an oxide type, sulfide type, hydride type, halide type, borate type, phosphate type, lithium phosphorus oxynitride (LiPON), garnet-type, lithium superionic conductor (LISICON) type, sodium superionic conductor (NASICON) type, or a combination thereof.

The inorganic solid electrolytes that can be incorporated into the electrolyte include, but are not limited to, perovskite-type, NASICON-type, garnet-type and sulfide-type materials. A representative and well-known perovskite solid electrolyte is $Li_{3x}La_{2/3-x}TiO_3$, which exhibits a lithium-ion conductivity exceeding $10^{-3}$ S/cm at room temperature. This material has been deemed unsuitable in lithium batteries because of the reduction of $Ti^{4+}$ on contact with lithium metal. However, we have found that this material, when dispersed in an elastic polymer, does not suffer from this problem.

The sodium superionic conductor (NASICON)-type compounds include a well-known $Na_{1+x}Zr_2Si_xP_{3-x}O_{12}$. These materials generally have an $AM_2(PO_4)_3$ formula with the A site occupied by Li, Na or K. The M site is usually occupied by Ge, Zr or Ti. In particular, the $LiTi_2(PO_4)_3$ system has been widely studied as a solid-state electrolyte for the lithium-ion battery. The ionic conductivity of $LiZr_2(PO_4)_3$ is very low, but can be improved by the substitution of Hf or Sn. This can be further enhanced with substitution to form $Li_{1+x}M_xTi_{2-x}(PO_4)_3$ (M=Al, Cr, Ga, Fe, Sc, In, Lu, Y or La). Al substitution has been demonstrated to be the most effective solid state electrolyte. The $Li_{1+x}Al_xGe_{2-x}(PO_4)_3$ system is also an effective solid state due to its relatively wide electrochemical stability window. NASICON-type materials are considered as suitable solid electrolytes for high-voltage solid electrolyte batteries.

Garnet-type materials have the general formula $A_3B_2Si_3O_{12}$, in which the A and B cations have eightfold and sixfold coordination, respectively. In addition to $Li_3M_2Ln_3O_{12}$ (M=W or Te), a broad series of garnet-type materials may be used as an additive, including $Li_5La_3M_2O_{12}$ (M=Nb or Ta), $Li_6ALa_2M_2O_{12}$ (A=Ca, Sr or Ba; M=Nb or Ta), $Li_{5.5}La_3M_{1.75}B_{0.25}O_{12}$ (M=Nb or Ta; B=In or Zr) and the cubic systems $Li_7La_3Zr_2O_{12}$ and $Li_{7.06}M_3Y_{0.06}Zr_{1.94}O_{12}$ (M=La, Nb or Ta). The $Li_{6.5}La_3Zr_{1.75}Te_{0.25}O_{12}$ compounds have a high ionic conductivity of $1.02 \times 10^{-3}$ S/cm at room temperature.

The sulfide-type solid electrolytes include the $Li_2S$—$SiS_2$ system. The highest reported conductivity in this type of material is $6.9 \times 10^{-4}$ S/cm, which was achieved by doping the $Li_2S$—$SiS_2$ system with $Li_3PO_4$. The sulfide type also includes a class of thio-LISICON (lithium superionic conductor) crystalline material represented by the $Li_2S$—$P_2S_5$ system. The chemical stability of the $Li_2S$—$P_2S_5$ system is considered as poor, and the material is sensitive to moisture (generating gaseous $H_2S$). The stability can be improved by the addition of metal oxides. The stability is also significantly improved if the $Li_2S$—$P_2S_5$ material is dispersed in an elastic polymer.

These solid electrolyte particles dispersed in an electrolyte polymer can help enhance the lithium-ion conductivity of certain polymers having an intrinsically low ion conductivity.

Preferably and typically, the polymer has a lithium-ion conductivity no less than $10^{-5}$ S/cm, more preferably no less than $10^{-4}$ S/cm, and further preferably no less than $10^{-3}$ S/cm.

The disclosed lithium battery can be a lithium-ion battery or a lithium metal battery, the latter having lithium metal as the primary anode active material. The lithium metal battery can have lithium metal implemented at the anode when the cell is made. Alternatively, the lithium may be stored in the cathode active material and the anode side is lithium metal-free initially. This is called an anode-less lithium metal battery.

Figure 2A:
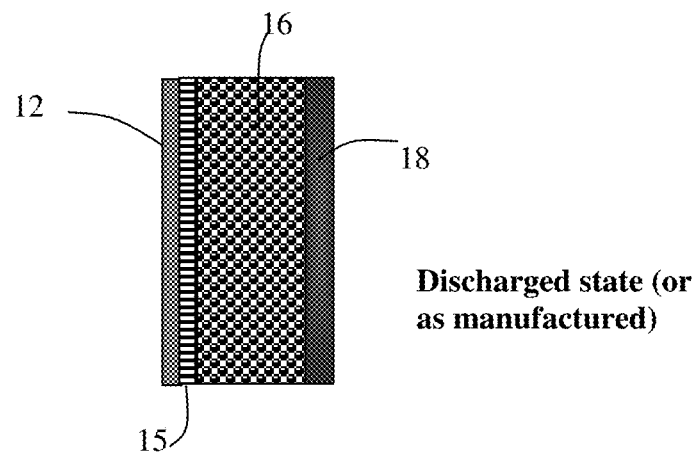
FIG. 2(A) Structure of an anode-less lithium metal cell (as manufactured or in a discharged state) according to some embodiments of the present disclosure.

As illustrated in FIG. 2(A), the anode-less lithium cell is in an as-manufactured or fully discharged state according to certain embodiments of the present disclosure. The cell comprises an anode current collector 12 (e.g., Cu foil), a separator, a cathode layer 16 comprising a cathode active material, an optional conductive additive (not shown), an optional resin binder (not shown), and an electrolyte (dispersed in the entire cathode layer and in contact with the cathode active material), and a cathode current collector 18 that supports the cathode layer 16. There is no lithium metal in the anode side when the cell is manufactured.

Figure 2B:
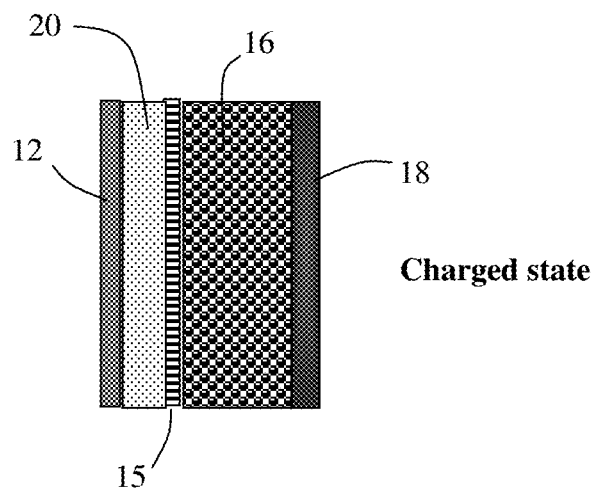
FIG. 2(B) Structure of an anode-less lithium metal cell (in a charged state) according to some embodiments of the present disclosure.

In a charged state, as illustrated in FIG. 2(B), the cell comprises an anode current collector 12, lithium metal 20 plated on a surface (or two surfaces) of the anode current collector 12 (e.g., Cu foil), a separator 15, a cathode layer 16, and a cathode current collector 18 supporting the cathode layer. The lithium metal comes from the cathode active material (e.g., $LiCoO_2$ and $LiMn_2O_4$) that contains Li element when the cathode is made. During a charging step, lithium ions are released from the cathode active material and move to the anode side to deposit onto a surface or both surfaces of an anode current collector.

One unique feature of the presently disclosed anode-less lithium cell is the notion that there is substantially no anode active material and no lithium metal is present when the battery cell is made. The commonly used anode active material, such as an intercalation type anode material (e.g., graphite, carbon particles, Si, SiO, Sn, $SnO_2$, Ge, etc.), P, or any conversion-type anode material, is not included in the cell. The anode only contains a current collector or a protected current collector. No lithium metal (e.g., Li particle, surface-stabilized Li particle, Li foil, Li chip, etc.) is present in the anode when the cell is made; lithium is basically stored in the cathode (e.g., Li element in $LiCoO_2$, $LiMn_2O_4$, lithium iron phosphate, lithium polysulfides, lithium polyselenides, etc.). During the first charge procedure after the cell is sealed in a housing (e.g., a stainless steel hollow cylinder or an Al/plastic laminated envelop), lithium ions are released from these Li-containing compounds (cathode active materials) in the cathode, travel through the electrolyte/separator into the anode side, and get deposited on the surfaces of an anode current collector. During a subsequent discharge procedure, lithium ions leave these surfaces and travel back to the cathode, intercalating or inserting into the cathode active material.

Such an anode-less cell is much simpler and more cost-effective to produce since there is no need to have a layer of anode active material (e.g., graphite particles, along with a conductive additive and a binder) pre-coated on the Cu foil surfaces via the conventional slurry coating and drying procedures. The anode materials and anode active layer manufacturing costs can be saved. Furthermore, since there is no anode active material layer (otherwise typically 40-200 μm thick), the weight and volume of the cell can be significantly reduced, thereby increasing the gravimetric and volumetric energy density of the cell.

Another important advantage of the anode-less cell is the notion that there is no lithium metal in the anode when a lithium metal cell is made. Lithium metal (e.g., Li metal foil and particles) is highly sensitive to air moisture and oxygen and notoriously known for its difficulty and danger to handle during manufacturing of a Li metal cell. The manufacturing facilities should be equipped with special class of dry rooms, which are expensive and significantly increase the battery cell costs.

The anode current collector may be selected from a foil, perforated sheet, or foam of Cu, Ni, stainless steel, Al, graphene, graphite, graphene-coated metal, graphite-coated metal, carbon-coated metal, or a combination thereof. Preferably, the current collector is a Cu foil, Ni foil, stainless steel foil, graphene-coated Al foil, graphite-coated Al foil, or carbon-coated Al foil.

The anode current collector typically has two primary surfaces. Preferably, one or both of these primary surfaces is deposited with multiple particles or coating of a lithium-attracting metal (lithiophilic metal), wherein the lithium-attracting metal, preferably having a diameter or thickness from 1 nm to 10 μm, is selected from Au, Ag, Mg, Zn, Ti, K, Al, Fe, Mn, Co, Ni, Sn, V, Cr, an alloy thereof, or a combination thereof. This deposited metal layer may be further deposited with a layer of graphene that covers and protects the multiple particles or coating of the lithiophilic metal.

The graphene layer may comprise graphene sheets selected from single-layer or few-layer graphene, wherein the few-layer graphene sheets are commonly defined to have 2-10 layers of stacked graphene planes having an inter-plane spacing $d_{002}$ from 0.3354 nm to 0.6 nm as measured by X-ray diffraction. The single-layer or few-layer graphene sheets may contain a pristine graphene material having essentially zero % of non-carbon elements, or a non-pristine graphene material having 0.001% to 45% by weight of non-carbon elements. The non-pristine graphene may be selected from graphene oxide, reduced graphene oxide, graphene fluoride, graphene chloride, graphene bromide, graphene iodide, hydrogenated graphene, nitrogenated graphene, doped graphene, chemically functionalized graphene, or a combination thereof.

The graphene layer may comprise graphene balls and/or graphene foam. Preferably, the graphene layer has a thickness from 1 nm to 50 μm and/or has a specific surface area from 5 to 1000 $m^2/g$ (more preferably from 10 to 500 $m^2/g$).

For a lithium-ion battery featuring the presently disclosed electrolyte, there is no particular restriction on the selection of an anode active material. The anode active material may be selected from the group consisting of: (a) silicon (Si), germanium (Ge), tin (Sn), lead (Pb), antimony (Sb), phosphorus (P), bismuth (Bi), zinc (Zn), aluminum (Al), titanium (Ti), nickel (Ni), cobalt (Co), and cadmium (Cd); (b) alloys or intermetallic compounds of Si, Ge, Sn, Pb, Sb, Bi, Zn, Al, Ti, Ni, Co, or Cd with other elements; (c) oxides, carbides, nitrides, sulfides, phosphides, selenides, and tellurides of Si, Ge, Sn, Pb, Sb, Bi, Zn, Al, Ti, Fe, Ni, Co, V, or Cd, and their mixtures, composites, or lithium-containing composites; (d) salts and hydroxides of Sn; (e) lithium titanate, lithium manganate, lithium aluminate, lithium titanium niobate, lithium-containing titanium oxide, lithium transition metal oxide, $ZnCo_2O_4$; (f) carbon or graphite particles (g) prelithiated versions thereof; and (h) combinations thereof.

A highly significant observation is that the polymer can dramatically curtail the amount of volatile solvent molecules that can escape into the vapor phase in a thermodynamic equilibrium condition. In many cases, this has effectively prevented any flammable gas molecules from initiating a flame even at an extremely high temperature. The flash point of the quasi-solid or solid-state electrolyte is typically at least 100 degrees (often >150 degrees) higher than the flash point of the neat organic solvent without polymerization. In most of the cases, either the flash point is significantly higher than 200° C. or no flash point can be detected. The electrolyte just would not catch on fire. Furthermore, any accidentally initiated flame does not sustain for longer than 3 seconds. This is a highly significant discovery, considering the notion that fire and explosion concern has been a major impediment to widespread acceptance of battery-powered electric vehicles. This new technology could significantly impact the emergence of a vibrant EV industry.

In addition to the non-flammability and high lithium ion transference numbers, there are several additional benefits associated with using the presently disclosed quasi-solid electrolytes. As one example, these electrolytes can significantly enhance cycling and safety performance of rechargeable lithium batteries through effective suppression of lithium dendrite growth. Due to a good contact between the electrolyte and an electrode, the interfacial impedance can be significantly reduced. Additionally, the local high viscosity induced by presence of a polymer in the anode can increase the pressure from the electrolyte to inhibit dendrite growth, potentially resulting in a more uniform deposition of lithium ions on the surface of the anode. The high viscosity could also limit anion convection near the deposition area, promoting more uniform deposition of Li ions. These reasons, separately or in combination, are believed to be responsible for the notion that no dendrite-like feature has been observed with any of the large number of rechargeable lithium cells that we have investigated thus far.

As another benefit example, this electrolyte is capable of inhibiting lithium polysulfide dissolution at the cathode and migration to the anode of a Li—S cell, thus overcoming the polysulfide shuttle phenomenon and allowing the cell capacity not to decay significantly with time. Consequently, a coulombic efficiency nearing 100% along with long cycle life can be achieved. When a concentrated electrolyte or crosslinked polymer is used, the solubility of lithium polysulfide will be reduced significantly.

There is also no restriction on the type of the cathode materials that can be used in practicing the present disclosure. For Li—S cells, the cathode active material may contain lithium polysulfide or sulfur. If the cathode active material includes lithium-containing species (e.g., lithium polysulfide) when the cell is made, there is no need to have a lithium metal pre-implemented in the anode.

The rechargeable lithium metal or lithium-ion cell may preferably contain a cathode active material selected from, as examples, a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

In a rechargeable lithium cell, the cathode active material may be selected from a metal oxide, a metal oxide-free inorganic material, an organic material, a polymeric material, sulfur, lithium polysulfide, selenium, or a combination thereof. The metal oxide-free inorganic material may be selected from a transition metal fluoride, a transition metal chloride, a transition metal dichalcogenide, a transition metal trichalcogenide, or a combination thereof. In a particularly useful embodiment, the cathode active material is selected from $FeF_3$, $FeCl_3$, $CuCl_2$, $TiS_2$, $TaS_2$, $MoS_2$, $NbSe_3$, $MnO_2$, $CoO_2$, an iron oxide, a vanadium oxide, or a combination thereof, if the anode contains lithium metal as the anode active material. The vanadium oxide may be preferably selected from the group consisting of $VO_2$, $Li_xVO_2$, $V_2O_5$, $Li_xV_2O_5$, $V_3O_8$, $Li_xV_3O_8$, $Li_xV_3O_7$, $V_4O_9$, $Li_xV_4O_9$, $V_6O_{13}$, $Li_xV_6O_{13}$, their doped versions, their derivatives, and combinations thereof, wherein $0.1 < x < 5$. For those cathode active materials containing no Li element therein, there should be a lithium source implemented in the cathode side to begin with. This can be any compound that contains a high lithium content, or a lithium metal alloy, etc.

In a rechargeable lithium cell (e.g., the lithium-ion battery cell), the cathode active material may be selected to contain a layered compound $LiMO_2$, spinel compound $LiM_2O_4$, olivine compound $LiMPO_4$, silicate compound $Li_2MSiO_4$, Tavorite compound $LiMPO_4F$, borate compound $LiMBO_3$, or a combination thereof, wherein M is a transition metal or a mixture of multiple transition metals.

Particularly desirable cathode active materials comprise lithium nickel manganese oxide ($LiNi_aMn_{2-a}O_4$, $0<a<2$), lithium nickel manganese cobalt oxide ($LiNi_nMn_mCo_{1-n-m}O_2$, $0<n<1$, $0<m<1$, $n+m<1$), lithium nickel cobalt aluminum oxide ($LiNi_cCo_dAl_{1-c-d}O_2$, $0<c<1$, $0<d<1$, $c+d<1$), lithium manganate ($LiMn_2O_4$), lithium iron phosphate ($LiFePO_4$), lithium manganese oxide ($LiMnO_2$), lithium cobalt oxide ($LiCoO_2$), lithium nickel cobalt oxide ($LiNi_pCo_{1-p}O_2$, $0<p<1$), or lithium nickel manganese oxide ($LiNi_qMn_{2-q}O_4$, $0<q<2$).

In a preferred lithium metal secondary cell, the cathode active material preferably contains an inorganic material selected from: (a) bismuth selenide or bismuth telluride, (b) transition metal dichalcogenide or trichalcogenide, (c) sulfide, selenide, or telluride of niobium, zirconium, molybdenum, hafnium, tantalum, tungsten, titanium, cobalt, manganese, iron, nickel, or a transition metal; (d) boron nitride, or (e) a combination thereof. Again, for those cathode active materials containing no Li element therein, there should be a lithium source implemented in the cathode side to begin with.

In another preferred rechargeable lithium cell (e.g. a lithium metal secondary cell or a lithium-ion cell), the cathode active material contains an organic material or polymeric material selected from Poly(anthraquinonyl sulfide) (PAQS), lithium oxocarbons (including squarate, croconate, and rhodizonate lithium salts), oxacarbon (including quinines, acid anhydride, and nitrocompound), 3,4,9,10-perylenetetracarboxylic dianhydride (PTCDA), poly(anthraquinonyl sulfide), pyrene-4,5,9,10-tetraone (PYT), polymer-bound PYT, Quino(triazene), redox-active organic material (redox-active structures based on multiple adjacent carbonyl groups (e.g., "$C_6O_6$"-type structure, oxocarbons), Tetracyanoquinodimethane (TCNQ), tetracyanoethylene (TCNE), 2,3,6,7,10,11-hexamethoxytriphenylene (HMTP), poly(5-amino-1,4-dyhydroxy anthraquinone) (PADAQ), phosphazene disulfide polymer ($[(NPS_2)_3]n$), lithiated 1,4,5,8-naphthalenetetraol formaldehyde polymer, Hexaazatrinaphtylene (HATN), Hexaazatriphenylene hexacarbonitrile (HAT(CN)6), 5-Benzylidene hydantoin, Isatine lithium salt, Pyromellitic diimide lithium salt, tetrahydroxy-p-benzoquinone derivatives (THQLi$_4$), N,N'-diphenyl-2,3,5,6-tetraketopiperazine (PHP), N,N'-diallyl-2,3,5,6-tetraketopiperazine (AP), N,N'-dipropyl-2,3,5,6-tetraketopiperazine (PRP), a thioether polymer, a quinone compound, 1,4-benzoquinone, 5,7,12,14-pentacenetetrone (PT), 5-amino-2,3-dihydro-1,4-dyhydroxy anthraquinone (ADDAQ), 5-amino-1,4-dyhydroxy anthraquinone (ADAQ), calixquinone, $Li_4C_6O_6$, $Li_2C_6O_6$, $Li_6C_6O_6$, or a combination thereof.

The thioether polymer may be selected from Poly[methanetetryl-tetra(thiomethylene)](PMTTM), Poly(2,4-dithiopentanylene) (PDTP), or Poly(ethene-1,1,2,2-tetrathiol) (PETT) as a main-chain thioether polymer, in which sulfur atoms link carbon atoms to form a polymeric backbones. The side-chain thioether polymers have polymeric main-chains that consist of conjugating aromatic moieties, but having thioether side chains as pendants. Among them Poly(2-phenyl-1,3-dithiolane) (PPDT), Poly(1,4-di(1,3-dithiolan-2-yl)benzene) (PDDTB), poly(tetrahydrobenzodithiophene) (PTHBDT), and poly[1,2,4,5-tetrakis(propylthio)benzene](PTKPTB) have a polyphenylene main chain, linking thiolane on benzene moieties as pendants. Similarly, poly[3,4(ethylenedithio)thiophene] (PEDTT) has polythiophene backbone, linking cyclo-thiolane on the 3,4-position of the thiophene ring.

In yet another preferred rechargeable lithium cell, the cathode active material contains a phthalocyanine compound selected from copper phthalocyanine, zinc phthalocyanine, tin phthalocyanine, iron phthalocyanine, lead phthalocyanine, nickel phthalocyanine, vanadyl phthalocyanine, fluorochromium phthalocyanine, magnesium phthalocyanine, manganous phthalocyanine, dilithium phthalocyanine, aluminum phthalocyanine chloride, cadmium phthalocyanine, chlorogallium phthalocyanine, cobalt phthalocyanine, silver phthalocyanine, a metal-free phthalocyanine, a chemical derivative thereof, or a combination thereof. This class of lithium secondary batteries has a high capacity and high energy density. Again, for those cathode active materials containing no Li element therein, there should be a lithium source implemented in the cathode side to begin with.

The following examples are presented primarily for the purpose of illustrating the best mode practice of the present disclosure, not to be construed as limiting the scope of the present disclosure.

Example 1: Selected Ion-Conducting Polymers and First Liquid Solvents Investigated Table 1 below provides some useful ion-conducting polymers and the corresponding solvents capable of dissolving these polymers. These solvents may be used alone or in a mixture with certain organic polymers that are capable of dissolving a great proportion of a lithium salt.

TABLE 1

| Polymers | First Liquid Solvents |
| --- | --- |
| poly(ethylene oxide) | Water, methylene chloride, ethanol, toluene, acetone, chloroform |
| polypropylene oxide | n-heptane, n-octane, n-nonane, benzene, toluene, ethanol, propanol, ethyl acetate, and N,N-dimethylformamide |
| polyoxymethylene | Chlorophenols and Benzyl alcohol above 70° C. |
| polyvinylene carbonate | Acetone, dimethylformamide |
| poly(vinylidene fluoride)-hexafluoropropylene | Acetone, N-N, dimethylacetamide |
| polyacrylamide | acetone, ethanol, dimethylformamide (DMF), ethylene glycol (EG), and water |
| polyphosphazene | Certain phosphazenes are water-soluble (see the two chemical structures shown below the table; |

TABLE 1-continued

| Polymers | First Liquid Solvents |
| --- | --- |
| polyphosphate | poly(dichlorophosphazene) is soluble in benzene, toluene, or tetrahydrofuran tetrachlorethane |
| polyphosphonate | aliphatic poly(ethylene methylphosphonate)s are water-soluble |
| poly(vinyl phosphonic acid) | Water, polar organic solvent |
| Polyphosphoric Acid | polar aprotic solvents |

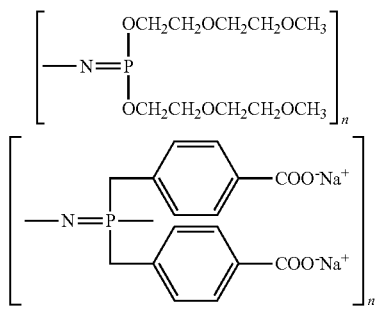

Example 2: Lithium Metal Cell Featuring an In Situ Solidified PEO as the First Liquid Solvent and TEP as a Second Liquid Solvent PEO and LiTFSI were dissolved in DMF to form an electrolyte solution using DMF as a first liquid solvent. The PEO/LiTFSI weight ratio was 3/1. TEP, having the following chemical structure, was used as the second liquid solvent:

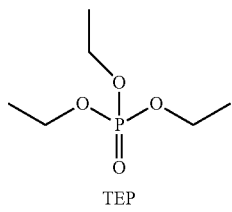

TEP

A lithium metal cell was made, comprising a lithium metal foil as the anode active material, a cathode comprising $LiCoO_2$, and a solid-state electrolyte-based separator composed of particles of $Li_7La_3Zr_2O_{12}$ embedded in a polyvinylidene fluoride matrix (having inorganic solid electrolyte/PVDF ratio=4/6). This cell was then injected with the electrolyte solution and DMF was removed in a vacuum oven at 60° C. overnight. The cell was then re-filled with TEP, resulting in a quasi-solid electrolyte that permeates into the cathode to wet the surfaces of $LiCoO_2$ particles, impregnates the porous separator, and comes in contact with the lithium metal in the anode.

Example 3: Poly(dichlorophosphazene) as an Ion-Conducting Polymer, THF as a First Solvent and an Unsaturated Phosphazene as a Second Solvent Poly(dichlorophosphazene) and LiTFSI were dissolved in THF to form an electrolyte solution using THF as a first liquid solvent. Similar procedure as in Example 2 was followed, but the second liquid solvent was an unsaturated phosphazene (UPA) having the following structure:

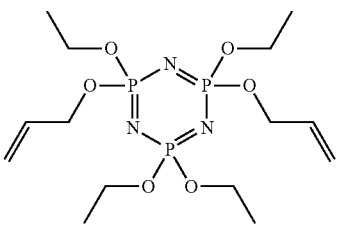 [SMILES: C=CCOP1(OCC)=NP(OCC)(OCC)=NP(OCC)(OCC=C)=N1]

This UPA was synthesized according to a procedure reported by Mason K. Harrup, et al. "Unsaturated phosphazenes as co-solvents for lithium-ion battery electrolytes," Journal of Power Sources 278 (2015) 794-801.

Example 4: Eutectic Mixture of 1,3,5-Trioxane (TXE) and Succinonitrile (SN) as the First Liquid Solvent and Trifluoro-Phosphate (TFP) as the Second Liquid Solvent In this study, a eutectic solvent containing 1,3,5-trioxane (TXE) and succinonitrile (SN) was used as the first liquid solvent, lithium difluoro(oxalate) borate (LiDFOB) as the lithium salt, and PPO as the ion-conducting polymer. TFP was as the second flame-retardant liquid solvent. TFP has the following chemical structure:

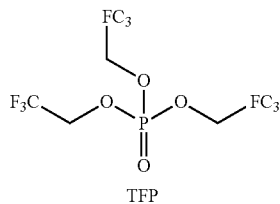

TFP

Solutions containing 1.5 M LiDFOB in the TXE/SN eutectic solvent at 65° C. to form an electrolyte solution. The electrolyte solution was injected into different dry battery cells, allowing the electrolyte solution to permeate into the anode (wetting out the surfaces of an anode active material; e.g., graphite particles), into the cathode (wetting out the surfaces of a cathode active material; e.g., NCM-532 particles), and into the porous separator layer (porous PE/PP film or nonwoven of electro-spun PAN nano-fibers). The battery cells were subjected to vacuum-assisted solvent removal at 60° C. for 24 h and then 80° C. for another 2 h to remove most of the TXE. The second liquid solvent TFP was injected into the cells to mix with PPO and SN to obtain a quasi-solid electrolyte that contained TFP and SN in a matrix of PPO polymer chains. Presumably, the TFP can increase the lithium-ion conductivity of the electrolyte.

Example 5: EC/DEC/DMC as the First Solvent and Hydrofluoro Ether (HFE) as the Second Solvent In this study, Poly(ethylene glycol) diacrylate (PEGDA) and lithium hexafluorophosphate ($LiPF_6$) were dissolved in EC/DEC/DMC (6/2/2 ratio), under the protection of an argon gas atmosphere, to form an electrolyte solution. The mixed solution was added to a lithium-ion cell having an NCM cathode, graphite anode, and porous PE/PP membrane. After the mixed solution was injected, the mixed solution accounted for 5% of the total cell weight. The cell was then subjected to solvent removal in a vacuum oven at 50° C. until substantially all EC/DEC/DMC was removed, leaving behind some pores. The pores were then re-filled with HFE, a flame-resistant liquid solvent.

Example 6: Lithium-Ion Cell Featuring an In Situ Solidified Polyvinylene Carbonate in the Presence of a Second Solvent TMS TMS has the following chemical formula:

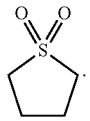

The lithium-ion cells prepared in this example comprise an anode of meso-carbon micro-beads (MCMB, an artificial graphite supplied from China Steel Chemical Co. Taiwan), a cathode of NCM-622 particles, and a porous PE/PP membrane as a separator. An anode active layer (supported on a Co foil) and a cathode active layer (on an Al foil) were separately prepared by using the conventional slurry coating process. The anode layer contained a SBR rubber as a resin binder and the cathode layer contained PVDF as a resin binder (5% acetylene black as a conductive additive). An electrolyte solution was made by dissolving polyvinylene carbonate (PVCa) and LiTFSI in acetone/DMF having a PVCa/LiTFSI/solvent weight ratio of 4/1/95. The electrolyte solution was impregnated into the anode layer and the cathode layer, followed by solvent removal. The resulting anode, cathode, and porous PE/PP membrane were then stacked and encased in a laminated plastic-Al foil envelope to form a dry cell.

Approximately 5% by weight of lithium trifluoro-methanesulfonate (LiCF$_3$SO$_3$) was dissolved in TMS (second solvent) to form a second solution. The second solution was injected into the lithium-ion cell to obtain a battery cell containing an in situ solidified polymer electrolyte.

Example 7: Lithium-Ion Cell Featuring an In Situ Solidified Poly(Vinylidene Fluoride)-Hexafluoropropylene (PVDF-HFP)

The lithium-ion cells prepared in this example comprise an anode of graphene-protected Si particles, a cathode of NCM-622 particles, and a porous PE/PP membrane as a separator.

PVDF-HFP and LiTFSI (polymer-to-salt ratio=4/1) were dissolved in a mixture solvent of acetone and DMF to form an electrolyte solution, which was injected into dry lithium-ion cells. This was followed by removal of the liquid solvent, allowing PVDF-HFP to solidified and the cell to have pores.

The second solvent may be selected from pyridine, sulfolane, Trimethyl phosphate (TMP), Trifluoro-Phosphate (TFP), etc. Trimethyl phosphate has the following chemical

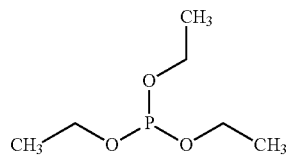

TFP was then injected into the dry cells to form lithium-ion cells having a quasi-solid electrolyte.

Example 8: Quasi-Solid Electrolytes from Vinylphosphonic Acid (VPA)

The free radical polymerization of vinylphosphonic acid (VPA) can be catalyzed with benzoyl peroxide as the initiator. In a procedure, 150 parts vinylphosphonic acid, 0.75 parts benzoyl peroxide, and 20 parts of lithium bis(oxalato) borate (LiBOB) were dissolved in 150 parts isopropanol. The resulting solution was then heated for 5 hours at 90° C. to form a polymer solution containing polyvinylphosphonic acid and LiBOB suspended/dissolved in isopropanol.

A natural graphite-based anode and a LiCoO$_2$-based cathode were separately impregnated with the polymer solution, followed by removal of most of the isopropanol and replaced with TFP as a second solvent. mixed with 5% by weight TFP.

In a separate experiment, vinylphosphonic acid was heated to >45° C. (melting point of VPA=36° C.), which was added with benzoyl peroxide, LiBOB, and 25% by weight of a garnet-type solid electrolyte (Li$_7$La$_3$Zr$_2$O$_{12}$ (LLZO) powder). After rigorous stirring, the resulting paste was cast onto a glass surface and cured at 90° C. for 5 hours to form a solid electrolyte separator to be disposed between an anode and a cathode layer.

For a lithium-ion cell, the natural graphite-based anode, the solid electrolyte separator, and the LiCoO$_2$-based cathode were combined. For an anode-less lithium cell, a solid electrolyte separator layer is implemented between a Cu foil and a LiCoO$_2$-based cathode layer.

Electrochemical measurements (CV curves) were carried out in an electrochemical workstation at a scanning rate of 1-100 mV/s. The electrochemical performance of the cells was evaluated by galvanostatic charge/discharge cycling at a current density of 50-500 mA/g using an Arbin electrochemical workstation. Testing results indicate that the cells containing quasi-solid electrolytes obtained by in situ solidification perform very well. These cells are flame resistant and relatively safe.

Example 9: In Situ Solidified Vinylphosphonate Polymer Electrolytes in a Lithium/NCM-532 Cell (Initially the Cell being Lithium-Free) and Lithium-Ion Cell Containing a Si-Based Anode and an NCM-532 Cathode Diethyl vinylphosphonate was polymerized by a peroxide initiator (di-tert-butyl peroxide), along with LiBF$_4$, to a clear, light-yellow polymer of low molecular weight. In a typical procedure, diethyl vinylphosphonate (being a liquid at room temperature) were added with di-tert-butyl peroxide (1% by weight) and LiBF$_4$ (9% by weight) to form a reactive solution. The solution was heated to 45° C. and bulk polymerization was allowed to proceed for up to 12 hours in a small glass reactor. The polymer was dissolved in THF to form an electrolyte solution, which was impregnated into a graphene-coated Si particle-based anode and a NCM-532-based cathode, respectively. Subsequently, THF was removed via vacuum pumping and heat.

For the construction of a lithium-ion cell, the graphene-coated Si particle-based anode, a porous separator, and the NCM-532-based cathode were stacked and housed in a plastic/Al laminated envelop to form a cell. For the construction of a lithium metal cell, a Cu foil anode current collector, a porous separator, and a NCM-532-based cathode were stacked and housed in a plastic/Al laminated envelop to form a cell. Each cell was then injected with an unsaturated phosphazene as a second solvent.

Additionally, layers of diethyl vinylphosphonate polymer electrolytes were cast on glass surfaces and polymerized under comparable conditions. The lithium-ion conductivity of these solid-state electrolytes was measured. The lithium-ion conductivity of diethyl vinylphosphonate-derived polymers was found to be in the range from $5.4 \times 10^{-5}$ S/cm-$7.3 \times 10^{-4}$ S/cm without a second solvent. This solid state electrolyte is highly flame resistant. The presence of phosphazene liquid was found to increase the lithium-ion conductivity by 3-5 times.

In several samples, a garnet-type solid electrolyte ($Li_7La_3Zr_2O_{12}$ (LLZO) powder) was added into the cathode (NCM-532) in the anode-less lithium battery.

The invention claimed is:

1. A method of producing a rechargeable lithium battery cell comprising an anode, a cathode, a separator, and a quasi-solid electrolyte in ionic communication with the anode and the cathode, the method comprising (a) preparing a liquid electrolyte solution comprising an ion-conducting polymer dissolved or dispersed in a first liquid solvent, wherein the first liquid solvent includes a first lithium salt dissolved therein; (b) impregnating the electrolyte solution into the cathode, the anode, a porous structure of the separator, or the battery cell; (c) removing the first liquid solvent; and (d) impregnating a second liquid solvent into the cathode, the anode, the separator porous structure, or the battery cell, wherein the second liquid solvent includes a second lithium salt dissolved therein; wherein the ion-conducting polymer comprises a polymer having an ion conductivity from $10^{-8}$ S/cm to $10^{-2}$ S/cm when measured at room temperature without the presence of liquid solvent and the polymer does not occupy more than 30% by weight of the cathode, not counting a current collector weight, and a second liquid solvent-to-polymer ratio is from 1/100 to 95/5; and wherein at least one of the first liquid solvent and the second liquid solvent contains from 0.1% to 50% by weight of lithium salt relative to the ion-conducting polymer weight, wherein the method comprises impregnating the electrolyte solution into the cathode, removing the first liquid solvent, impregnating the second liquid solvent into the cathode prior to or after a step of combining the cathode, the anode, and the separator into a battery cell.

2. The method of claim 1, wherein the second liquid solvent comprises a solvent selected from the group consisting of fluorinated ethers, fluorinated esters, sulfones, sultones, sulfides, sulfites, nitriles, sulfates, siloxanes, silanes, phosphates, phosphonates, phosphinates, phosphines, phosphine oxides, phosphonic acids, phosphorous acid, phosphites, phosphoric acids, phosphazene compounds, ionic liquids, derivatives thereof, and combinations thereof.

3. The method of claim 1, wherein the second liquid solvent comprises a flame retardant selected from an organic phosphorus compound, an inorganic phosphorus compound, a halogenated derivative thereof, or a combination thereof.

4. The method of claim 3, wherein the organic phosphorus compound or the inorganic phosphorus compound is selected from the group consisting of phosphates, phosphonates, phosphonic acids, phosphorous acids, phosphites, phosphoric acids, phosphinates, phosphines, phosphine oxides, phosphazene compounds, derivatives thereof, and combinations thereof.

5. The method of claim 1, wherein the first liquid solvent is selected from the group consisting of vinylene carbonate (VC), ethylene carbonate (EC), propylene carbonate (PC), 1,2-dimethoxyethane (DME), 2-ethoxyethyl ether (EEE), sulfolane, dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), allyl ethyl carbonate (AEC), fluoroethylene carbonate (FEC), vinyl sulfite, vinyl ethylene sulfite, vinyl ethylene carbonate, 1,3-propyl sultone, 1,3,5-trioxane (TXE), 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, dinitriles, acrylonitrile (AN), acetone, acetonitrile, tetrahydrofuran (THF), alcohols, sulfates, siloxanes, silanes, N-methylacetamide, acrylates, ethylene glycols, phosphates, phosphonates, phosphinates, phosphines, phosphine oxides, phosphonic acids, phosphorous acid, phosphites, phosphoric acids, phosphazene compounds, derivatives thereof, and combinations thereof.

6. The method of claim 1, wherein the second liquid solvent comprises an ionic liquid selected from the group consisting of room temperature ionic liquids having a cation selected from tetraalkylammonium, di-, tri-, or tetra-alkylimidazolium, alkylpyridinium, dialkyl-pyrrolidinium, dialkylpiperidinium, tetraalkylphosphonium, hexakis(bromomethyl)benzene, and trialkylsulfonium, 1-vinyl-3-dodecyl imidazolium bis(trifluoromethanesulfonyl) imide (VDIM-TFSI), 1-vinyl-3-methylimidazolium bis[(trifluoromethyl)sulfonyl]imide (VMIMTFSI), [poly(diallyldimethyl ammonium bis(fluorosulfonyl)imide, $(C_{10}H_{16}F_2N_2O_4S_2)n$, vinylimidazolium monomers with N-alkyl substituents, and combinations thereof.

7. The method of claim 1, wherein the second liquid solvent comprises an ionic liquid having an anion selected from $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

8. The method of claim 1, wherein the second liquid solvent comprises a liquid selected from a phosphate, phosphonate, phosphinate, phosphine, or phosphine oxide having the structure of:

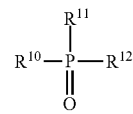

wherein $R^{10}$, $R^{11}$, and $R^{12}$, are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, and the second liquid solvent is stable under an applied electrical potential no less than 4 V.

9. The method of claim 1, wherein the second liquid solvent comprises a phosphoranimine having the structure of:

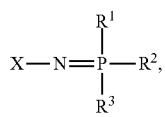

wherein $R^1$, $R^2$, and $R^3$ are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, wherein $R^1$, $R^2$, and $R^3$ are represented by at least two different substituents and wherein X is selected from the group consisting of an organosilyl group and a tert-butyl group.

10. The method of claim 9, wherein $R^1$, $R^2$, and $R^3$ are each independently selected from the group consisting of an alkoxy group, and an aryloxy group.

11. The method of claim 1, wherein the first lithium salt occupies 0.1%-30% by weight.

12. The method of claim 1, wherein the first or the second liquid solvent comprises a solvent selected from the group consisting of fluorinated vinyl carbonates, fluorinated vinyl monomers, fluorinated esters, fluorinated vinyl esters, and fluorinated vinyl ethers and combinations thereof.

13. The method of claim 1, wherein the second liquid solvent comprises a sulfone or sulfide selected from vinyl sulfone, allyl sulfone, alkyl vinyl sulfone, aryl vinyl sulfone, vinyl sulfide, TrMS, MTrMS, TMS, EMS, MMES, EMES, EMEES, or a combination thereof:

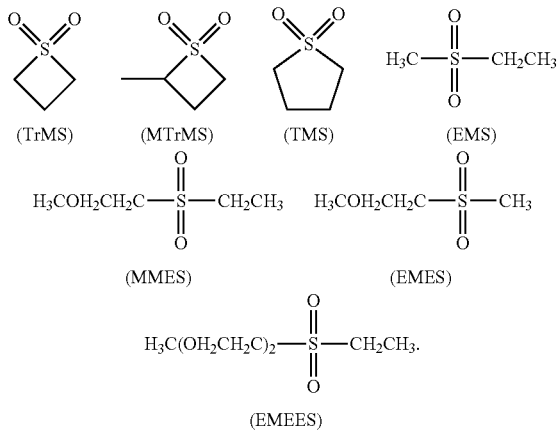

14. The method of claim 13, wherein the vinyl sulfone or sulfide is selected from ethyl vinyl sulfide, allyl methyl sulfide, phenyl vinyl sulfide, phenyl vinyl sulfoxide, allyl phenyl sulfone, allyl methyl sulfone, divinyl sulfone, or a combination thereof, wherein the vinyl sulfone does not include methyl ethylene sulfone and ethyl vinyl sulfone.

15. The method of claim 1, wherein the second liquid solvent comprises a mono nitrile, a dinitrile, acetonitrile, acrylonitrile, or a combination thereof.

16. The method of claim 1, wherein the second liquid solvent comprises a phosphate selected from allyl-type, vinyl-type, styrenic-type or (meth)acrylic-type monomers bearing a phosphonate moiety.

17. The method of claim 1, wherein the second liquid solvent comprises a phosphate, phosphonate, phosphonic acid, phosphazene, or phosphite selected from TMP, TEP, TFP, TDP, DPOF, DMMP, DMMEMP, tris(trimethylsilyl) phosphite (TTSPi), alkyl phosphate, triallyl phosphate (TAP), or a combination thereof, wherein TMP, TEP, TFP, TDP, DPOF, DMMP, DMMEMP, and phosphazene have the following chemical formulae:

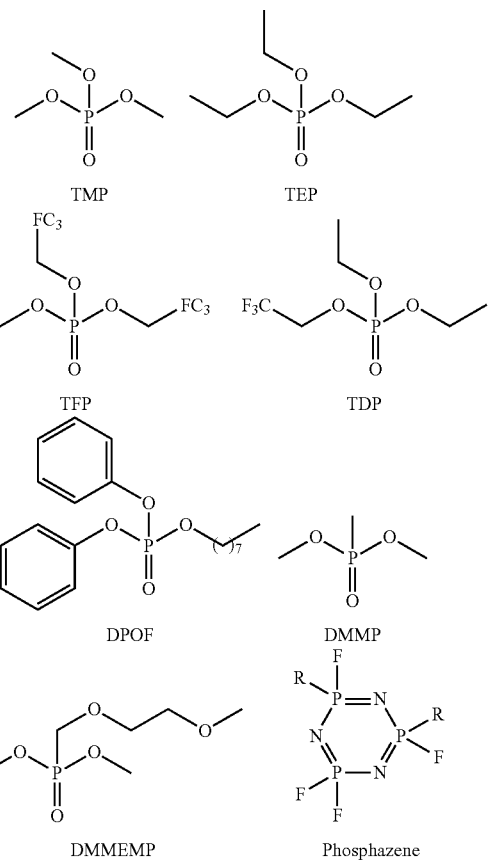

wherein R=H, $NH_2$, or $C_1$-$C_6$ alkyl.

18. The method of claim 1, wherein the first or the second liquid solvent comprises siloxane or silane selected from alkylsiloxane (Si—O), alkyylsilane (Si—C), liquid oligomeric silaxane (—Si—O—Si—), or a combination thereof.

19. The method of claim 1, wherein said lithium salt is selected from lithium perchlorate ($LiClO_4$), lithium hexafluorophosphate ($LiPF_6$), lithium borofluoride ($LiBF_4$), lithium hexafluoroarsenide ($LiAsF_6$), lithium trifluoromethanesulfonate ($LiCF_3SO_3$), bis-trifluoromethyl sulfonylimide lithium ($LiN(CF_3SO_2)_2$), lithium bis(oxalato)borate (LiBOB), lithium oxalyldifluoroborate ($LiBF_2C_2O_4$), lithium nitrate ($LiNO_3$), Li-fluoroalkyl-phosphates ($LiPF_3(CF_2CF_3)_3$), lithium bisperfluoro-ethysulfonylimide (Li- BETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

20. The method of claim 1, further comprising a step of impregnating the electrolyte solution into the anode, removing the first liquid solvent, impregnating the second liquid solvent into the anode prior to or after a step of combining the cathode, the anode, and the separator into a battery cell.

21. A method of producing a rechargeable lithium battery cell comprising an anode, a cathode, a separator, and a quasi-solid electrolyte in ionic communication with the anode and the cathode, the method comprising (a) preparing a liquid electrolyte solution comprising an ion-conducting polymer dissolved or dispersed in a first liquid solvent, wherein the first liquid solvent includes a first lithium salt dissolved therein; (b) impregnating the electrolyte solution into the cathode, the anode, a porous structure of the separator, or the battery cell; (c) removing the first liquid solvent; and (d) impregnating a second liquid solvent into the cathode, the anode, the separator porous structure, or the battery cell, wherein the second liquid solvent includes a second lithium salt dissolved therein; wherein the ion-conducting polymer comprises a polymer having an ion conductivity from $10^{-8}$ S/cm to $10^{-2}$ S/cm when measured at room temperature without the presence of liquid solvent and the polymer does not occupy more than 30% by weight of the cathode, not counting a current collector weight, and a second liquid solvent-to-polymer ratio is from 1/100 to 95/5; and wherein at least one of the first liquid solvent and the second liquid solvent contains from 0.1% to 50% by weight of lithium salt relative to the ion-conducting polymer weight, wherein the cathode is made by combining particles of a cathode active material, a conductive additive, and a resin binder that bonds the cathode active material particles and the conductive additive together to form a cathode active layer having pores and wherein the pores are filled with the ion-conducting polymer and the second liquid solvent wherein the ion-conducting polymer is different than the resin binder in chemical composition or structure.

22. The method of claim 21, wherein the second liquid solvent comprises a solvent selected from the group consisting of fluorinated ethers, fluorinated esters, sulfones, sultones, sulfides, sulfites, nitriles, sulfates, siloxanes, silanes, phosphates, phosphonates, phosphinates, phosphines, phosphine oxides, phosphonic acids, phosphorous acid, phosphites, phosphoric acids, phosphazene compounds, ionic liquids, derivatives thereof, and combinations thereof.

23. The method of claim 21, wherein the second liquid solvent comprises a flame retardant selected from an organic phosphorus compound, an inorganic phosphorus compound, a halogenated derivative thereof, or a combination thereof.

24. The method of claim 23, wherein the organic phosphorus compound or the inorganic phosphorus compound is selected from the group consisting of phosphates, phosphonates, phosphonic acids, phosphorous acids, phosphites, phosphoric acids, phosphinates, phosphines, phosphine oxides, phosphazene compounds, derivatives thereof, and combinations thereof.

25. The method of claim 21, wherein the first liquid solvent is selected from the group consisting of vinylene carbonate (VC), ethylene carbonate (EC), propylene carbonate (PC), 1,2-dimethoxyethane (DME), 2-ethoxyethyl ether (EEE), sulfolane, dimethyl carbonate (DMC), methylethyl carbonate (MEC), diethyl carbonate (DEC), ethyl propionate, methyl propionate, gamma-butyrolactone (γ-BL), acetonitrile (AN), ethyl acetate (EA), propyl formate (PF), methyl formate (MF), toluene, xylene, methyl acetate (MA), fluoroethylene carbonate (FEC), allyl ethyl carbonate (AEC), fluoroethylene carbonate (FEC), vinyl sulfite, vinyl ethylene sulfite, vinyl ethylene carbonate, 1,3-propyl sultone, 1,3,5-trioxane (TXE), 1,3-acrylic-sultones, methyl ethylene sulfone, methyl vinyl sulfone, ethyl vinyl sulfone, methyl methacrylate, vinyl acetate, acrylamide, 1,3-dioxolane (DOL), fluorinated ethers, fluorinated esters, sulfones, sulfides, dinitriles, acrylonitrile (AN), acetone, acetonitrile, tetrahydrofuran (THF), alcohols, sulfates, siloxanes, silanes, N-methylacetamide, acrylates, ethylene glycols, phosphates, phosphonates, phosphinates, phosphines, phosphine oxides, phosphonic acids, phosphorous acid, phosphites, phosphoric acids, phosphazene compounds, derivatives thereof, and combinations thereof.

26. The method of claim 21, wherein the second liquid solvent comprises an ionic liquid selected from the group consisting of room temperature ionic liquids having a cation selected from tetraalkylammonium, di-, tri-, or tetra-alkylimidazolium, alkylpyridinium, dialkyl-pyrrolidinium, dialkylpiperidinium, tetraalkylphosphonium, hexakis(bromomethyl)benzene, and trialkylsulfonium, 1-vinyl-3-dodecyl imidazolium bis(trifluoromethanesulfonyl) imide (VDIM-TFSI), 1-vinyl-3-methylimidazolium bis[(trifluoromethyl)sulfonyl]imide (VMIMTFSI), [(poly(diallyldimethyl ammonium bis(fluorosulfonyl)imide, $(C_{10}H_{16}F_2N_2O_4S_2)n$, vinylimidazolium monomers with N-alkyl substituents, and combinations thereof.

27. The method of claim 21, wherein the second liquid solvent comprises an ionic liquid having an anion selected from $BF_4^-$, $B(CN)_4^-$, $CH_3BF_3^-$, $CH_2CHBF_3^-$, $CF_3BF_3^-$, $C_2F_5BF_3^-$, n-$C_3F_7BF_3^-$, n-$C_4F_9BF_3^-$, $PF_6^-$, $CF_3CO_2^-$, $CF_3SO_3^-$, $N(SO_2CF_3)_2^-$, $N(COCF_3)(SO_2CF_3)^-$, $N(SO_2F)_2^-$, $N(CN)_2^-$, $C(CN)_3^-$, $SCN^-$, $SeCN^-$, $CuCl_2^-$, $AlCl_4^-$, $F(HF)_{2.3}^-$, or a combination thereof.

28. The method of claim 21, wherein the second liquid solvent comprises a liquid selected from a phosphate, phosphonate, phosphinate, phosphine, or phosphine oxide having the structure of:

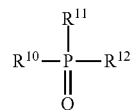

wherein $R^{10}$, $R^{11}$, and $R^{12}$, are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, and the second liquid solvent is stable under an applied electrical potential no less than 4 V.

29. The method of claim 21, wherein the second liquid solvent comprises a phosphoranimine having the structure of:

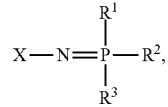

wherein R¹, R², and R³ are independently selected from the group consisting of alkyl, aryl, heteroalkyl, heteroaryl, halogen substituted alkyl, halogen substituted aryl, halogen substituted heteroalkyl, halogen substituted heteroaryl, alkoxy, aryloxy, heteroalkoxy, heteroaryloxy, halogen substituted alkoxy, halogen substituted aryloxy, halogen substituted heteroalkoxy, and halogen substituted heteroaryloxy functional groups, wherein R¹, R², and R³ are represented by at least two different substituents and wherein X is selected from the group consisting of an organosilyl group and a tert-butyl group.

30. The method of claim 29, wherein R¹, R², and R³ are each independently selected from the group consisting of an alkoxy group, and an aryloxy group.

31. The method of claim 21, wherein the first lithium salt occupies 0.1%-30% by weight.

32. The method of claim 21, wherein the first or the second liquid solvent comprises a solvent selected from the group consisting of fluorinated vinyl carbonates, fluorinated vinyl monomers, fluorinated esters, fluorinated vinyl esters, and fluorinated vinyl ethers and combinations thereof.

33. The method of claim 21, wherein the second liquid solvent comprises a sulfone or sulfide selected from vinyl sulfone, allyl sulfone, alkyl vinyl sulfone, aryl vinyl sulfone, vinyl sulfide, TrMS, MTrMS, TMS, EMS, MMES, EMES, EMEES, or a combination thereof:

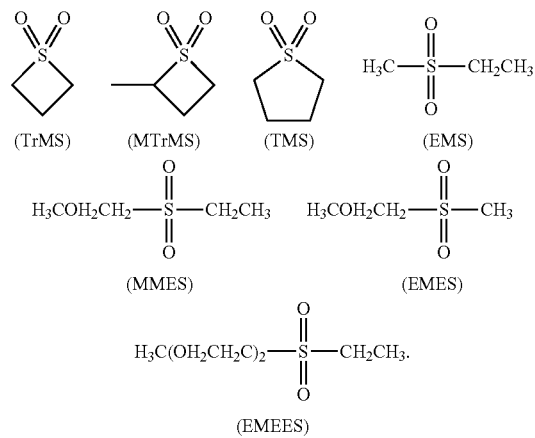

34. The method of claim 33, wherein the vinyl sulfone or sulfide is selected from ethyl vinyl sulfide, allyl methyl sulfide, phenyl vinyl sulfide, phenyl vinyl sulfoxide, allyl phenyl sulfone, allyl methyl sulfone, divinyl sulfone, or a combination thereof, wherein the vinyl sulfone does not include methyl ethylene sulfone and ethyl vinyl sulfone.

35. The method of claim 21, wherein the second liquid solvent comprises a mono nitrile, a dinitrile, acetonitrile, acrylonitrile, or a combination thereof.

36. The method of claim 21, wherein the second liquid solvent comprises a phosphate selected from allyl-type, vinyl-type, styrenic-type or (meth)acrylic-type monomers bearing a phosphonate moiety.

37. The method of claim 21, wherein the second liquid solvent comprises a phosphate, phosphonate, phosphonic acid, phosphazene, or phosphite selected from TMP, TEP, TFP, TDP, DPOF, DMMP, DMMEMP, tris(trimethylsilyl) phosphite (TTSPi), alkyl phosphate, triallyl phosphate (TAP), or a combination thereof, wherein TMP, TEP, TFP, TDP, DPOF, DMMP, DMMEMP, and phosphazene have the following chemical formulae:

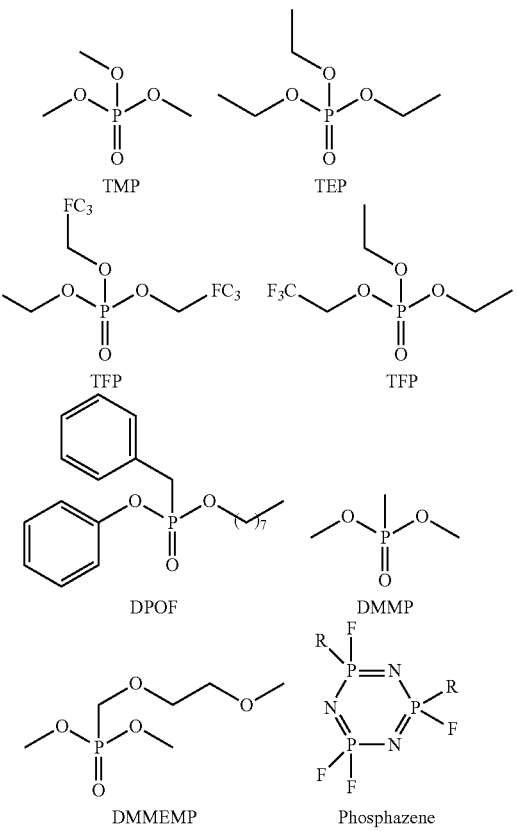

wherein R=H, NH₂, or $C_1$-$C_6$ alkyl.

38. The method of claim 21, wherein the first or the second liquid solvent comprises siloxane or silane selected from alkylsiloxane (Si—O), alkyylsilane (Si—C), liquid oligomeric silaxane (—Si—O—Si—), or a combination thereof.

39. The method of claim 21, wherein said lithium salt is selected from lithium perchlorate (LiClO₄), lithium hexafluorophosphate (LiPF₆), lithium borofluoride (LiBF₄), lithium hexafluoroarsenide (LiAsF₆), lithium trifluoromethanesulfonate (LiCF₃SO₃), bis-trifluoromethyl sulfonylimide lithium (LiN(CF₃SO₂)₂), lithium bis(oxalato)borate (LiBOB), lithium oxalyldifluoroborate (LiBF₂C₂O₄), lithium nitrate (LiNO₃), Li-fluoroalkyl-phosphates (LiPF₃(CF₂CF₃)₃), lithium bisperfluoro-ethysulfonylimide (LiBETI), lithium bis(trifluoromethanesulphonyl)imide, lithium bis(fluorosulphonyl)imide, lithium trifluoromethanesulfonimide (LiTFSI), an ionic liquid lithium salt, or a combination thereof.

40. A method of producing a rechargeable lithium battery cell comprising an anode, a cathode, a separator, and a quasi-solid electrolyte in ionic communication with the anode and the cathode, the method comprising (a) preparing a liquid electrolyte solution comprising an ion-conducting polymer dissolved or dispersed in a first liquid solvent, wherein the first liquid solvent includes a first lithium salt dissolved therein; (b) impregnating the electrolyte solution into the cathode, the anode, a porous structure of the separator, or the battery cell; (c) removing the first liquid solvent; and (d) impregnating a second liquid solvent into the cathode, the anode, the separator porous structure, or the battery cell, wherein the second liquid solvent includes a second lithium salt dissolved therein; wherein the ion-conducting polymer comprises a polymer having an ion conductivity from $10^{-8}$ S/cm to $10^{-2}$ S/cm when measured at room temperature without the presence of liquid solvent and the polymer does not occupy more than 30% by weight of the cathode, not counting a current collector weight, and a second liquid solvent-to-polymer ratio is from 1/100 to 95/5; and wherein at least one of the first liquid solvent and the second liquid solvent contains from 0.1% to 50% by weight of lithium salt relative to the ion-conducting polymer weight, wherein the anode is made by combining particles of an anode active material, a conductive additive, and a resin binder that bonds the anode active material particles and the conductive additive together to form an anode active layer having pores and wherein the pores are filled with the ion-conducting polymer and the second liquid solvent wherein the ion-conducting polymer is different than the resin binder in chemical composition or structure.

* * * * *